(12) United States Patent
Isono et al.

(10) Patent No.: US 7,472,651 B2
(45) Date of Patent: Jan. 6, 2009

(54) WASTE LIQUID REGENERATOR OF PRINTING MACHINE

(75) Inventors: Hitoshi Isono, Hiroshima-ken (JP);
Shoichi Aoki, Hiroshima-ken (JP);
Junichi Ibushi, Hiroshima-ken (JP);
Masayuki Eda, Hiroshima-ken (JP);
Minoru Sueda, Hiroshima-ken (JP);
Masahiro Harada, Hiroshima-ken (JP);
Seiji Enma, Hiroshima-ken (JP); Osamu Shinya, Hiroshima-ken (JP); Shinji Ueoku, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 30 days.

(21) Appl. No.: 10/537,589

(22) PCT Filed: Mar. 19, 2003

(86) PCT No.: PCT/JP03/03359

§ 371 (c)(1),
(2), (4) Date: Oct. 17, 2005

(87) PCT Pub. No.: WO2004/060816

PCT Pub. Date: Jul. 22, 2004

(65) Prior Publication Data

US 2006/0144268 A1    Jul. 6, 2006

(30) Foreign Application Priority Data

Dec. 27, 2002    (JP) .............................. 2004-380374

(51) Int. Cl.
    *B41F 35/00* (2006.01)
(52) U.S. Cl. ..................... 101/350.5; 101/425; 205/742
(58) Field of Classification Search ........................ None
    See application file for complete search history.

(56) References Cited

U.S. PATENT DOCUMENTS

| | | | | |
|---|---|---|---|---|
| 1,774,778 A | * | 9/1930 | Wise Wood | 101/350.5 |
| 3,926,114 A | * | 12/1975 | Matuschke | 101/350.5 |
| 4,288,303 A | | 9/1981 | Matson | |
| 4,527,479 A | * | 7/1985 | Dahlgren et al. | 101/350.5 |
| 4,774,884 A | * | 10/1988 | Sugimoto et al. | 101/170 |
| 6,267,871 B1 | | 7/2001 | Weakly et al. | |

FOREIGN PATENT DOCUMENTS

GB        1 308 470        2/1973

(Continued)

OTHER PUBLICATIONS

Tak-Hyun Kim et al., "Declorization of disperse and reactive dyes by continuous electrocoagulation process", Desalination, Elsevier, Amsterdam, NL, vol. 150, No. 2, Nov. 1, 2002, pp. 165-175, XP004454552, ISSN: 0011-9164.

(Continued)

*Primary Examiner*—Jill E. Culler
(74) *Attorney, Agent, or Firm*—Wenderick, Lind & Ponack, L.L.P.

(57) ABSTRACT

In a vessel (2) to which waste liquid (11) which contains ink pigment, water and cleaning liquid used in a printer is supplied, a metal electrode plate (30a, 30b) which allows the waste liquid (11) to flow therethrough is disposed to partition the inside of the vessel (2) into a first region (a) and a second region (b). A high voltage from a high-voltage power supply (7) is applied to the metal electrode plate (30a, 30b) while a grounding electrode (20) is connected to the first chamber (a) to generate an electrostatic field between the metal electrode plate (30a, 30b) and the grounding electrode (20) so that the water and the ink pigment are electrostatically agglomerated from the waste liquid (11) making use of electrophoresis of the ink pigment by the electrostatic field thereby to separate the waste liquid in the first region (a) into the cleaning liquid, water and ink pigment.

4 Claims, 29 Drawing Sheets

FOREIGN PATENT DOCUMENTS

| | | |
|---|---|---|
| JP | 53-10440 | 1/1978 |
| JP | 64-30691 | 2/1989 |
| JP | 2001-315312 | 11/2001 |
| JP | 2001-328243 | 11/2001 |
| JP | 2002-23583 | 1/2002 |
| JP | 2002-79259 | 3/2002 |
| JP | 2002-292834 | 10/2002 |
| RU | 2 152 359 C1 | 7/2000 |

OTHER PUBLICATIONS

T. Kurotori et al., "Electrophotographic Full Color Printer Using Liquid Developer", The Annual Conference of Japan Hardcopy for the Society of Electrophotography of Japan, The Society of Electrophotography of Japan, p. 155, lines 1-7, 1996, w/English abstract.

* cited by examiner

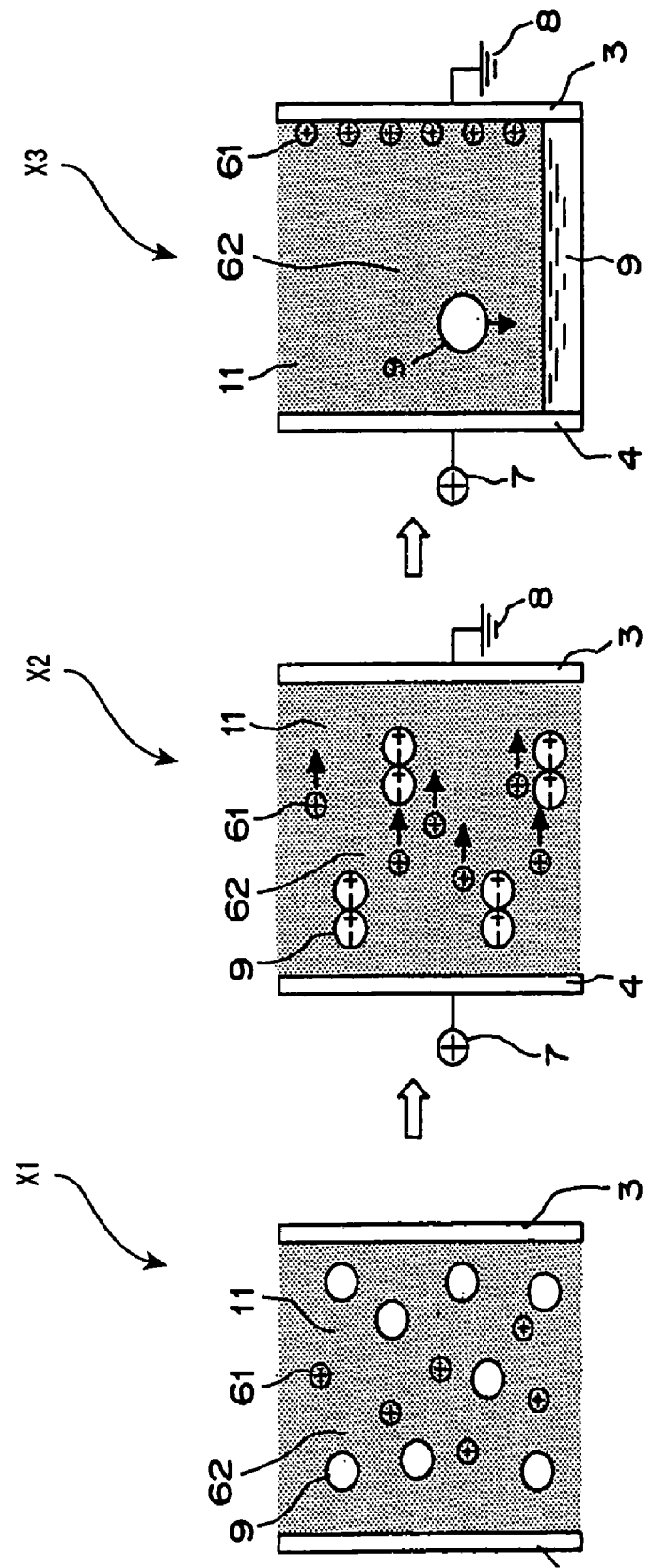

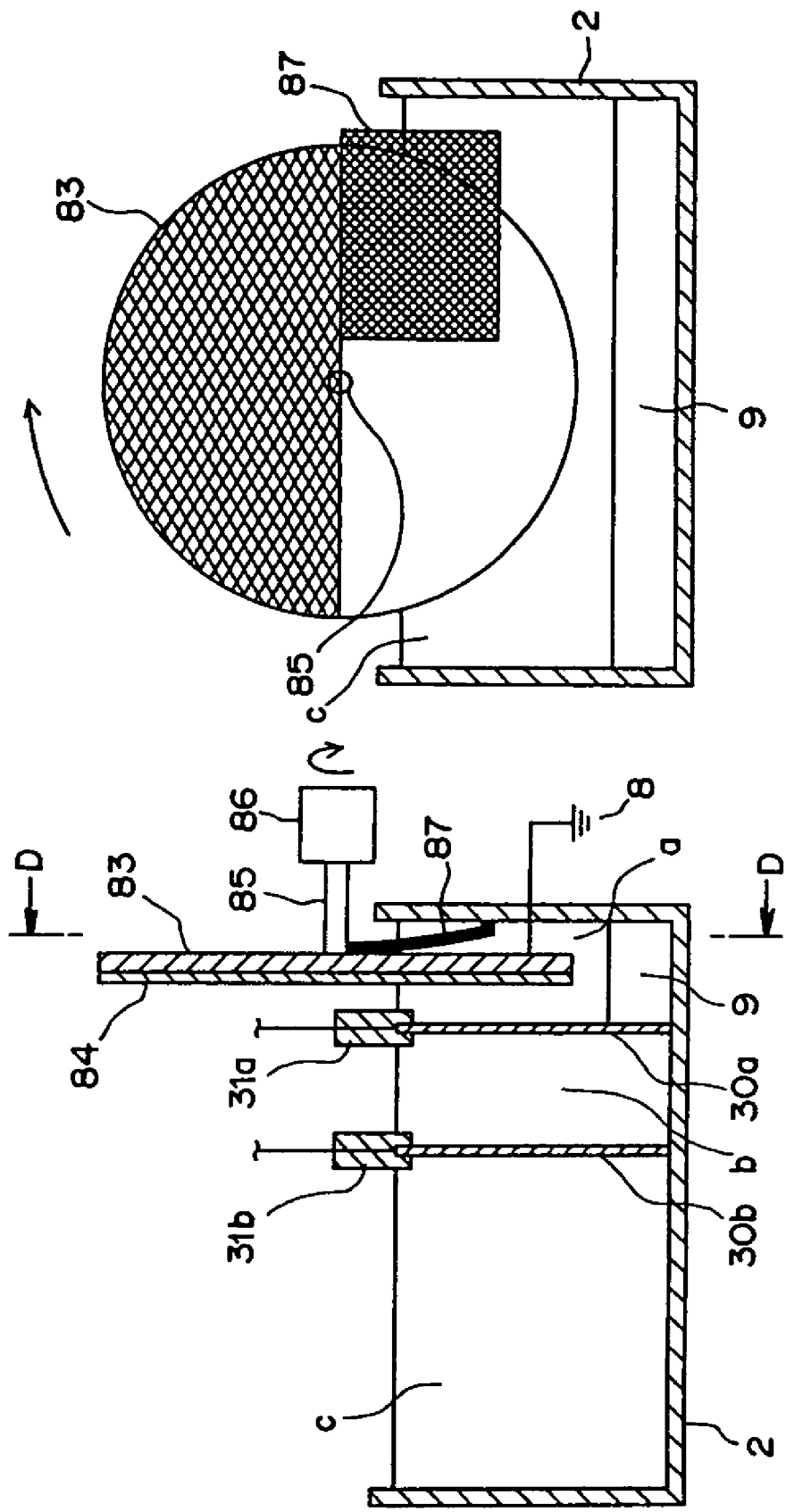

WASTE LIQUID REGENERATOR OF PRINTING MACHINE

TECHNICAL FIELD

This invention relates to an apparatus and a method for regenerating waste liquid which is produced when a component of a printer to which ink adheres such as a blanket drum is cleaned, and more particularly to a waste liquid regeneration apparatus and a waste liquid regeneration method for a printer used to separate, from a system which inudes charged ink pigment, insulating cleaning fluid and conductive water in a mixed state, the three components by means of a single apparatus.

BACKGROUND ART

When a blanket drum or an impression drum of a printer is cleaned, waste liquid is produced. A movement of applying some process to the waste liquid and disposing the processed waste liquid is promoted taking the terrestrial environment into consideration. In this instance, a cost (disposal cost) is required for the disposal process, and besides, since a large amount of cleaning liquid is used to clean a blanket drum and like elements, a high running cost is required.

Recently, it has been attempted to reprocess waste liquid to reuse cleaning liquid. One of the attempts is called settling method, and FIG. 30 shows a general configuration of a waste liquid regeneration apparatus used by the settling method. As shown in FIG. 30, the conventional waste liquid regeneration apparatus 51 includes a vessel 53 for storing cleaning waste liquid (waste liquid) 52. A bottom discharging pipe 54 is connected to the bottom wall of the vessel 53, and a side discharging pipe 55 is connected to a side wall of the vessel 53. Further, below an output of the bottom discharging pipe 54 from between the discharging pipes 54 and 55, a concentrated waste liquid recovery vessel 56 is disposed, and a regenerated cleaning liquid recovering vessel 57 is disposed below an exit of the side discharging pipe 55. Meanwhile, an on-off valve 58 is connected to a passage of the bottom discharging pipe 54, and another on-off valve 59 is connected on the upstream side to a passage of the side discharging pipe 55 and a filter 60 is connected on the downstream side with respect to the on-off valve 59.

In the waste liquid regeneration apparatus 51 having such a configuration as described above, waste liquid 52 after used to clean a blanket drum and other components of a printer is stored into the vessel 53 and some agent for promoting settling of ink pigment (sometimes referred to merely as pigment) 61 is added to the waste liquid 52 so that the ink pigment 61 is settled to the bottom of the vessel 53. Then, the settled ink pigment, that is, concentrated waste liquid 63, is recovered through the bottom discharging pipe 54 into the concentrated waste liquid recovery vessel 56, and supernatant liquid of the waste liquid 52 is filtered from the side discharging pipe 55 with the filter 60 to remove the ink pigment 61 and recovered into the regenerated cleaning liquid recovering vessel 57. cleaning liquid 62 obtained in this manner is reused.

With the method described, however, not only the purity of the regenerated cleaning liquid is insufficient, but depending upon the combination of the ink and the cleaning liquid, the settling of the ink pigment 61 is insufficient and the filter 60 suffers from clogging soon. Therefore, the method has a subject to be solved that exchange or cleaning of the filter 60 must be performed frequently.

Meanwhile, in the field of the electrophotograghy, also an aqueous development method wherein charged toner dispersed in solvent is deposited to an electrostatic latent image by electrophoresis so as to be visualized is adopted partially. Also a method for electrically removing charged toner powder from waste liquid after used for cleaning in the system just described has been proposed (official gazette of Japanese Patent Laid-Open NO. (Kokai) SHO53-10440). Further, a document (Kuroshima et al, A Collection of Japan Hardcopy '96 Theses, p153 (1996)) published recently in the society by the assignee of the present invention proposes a toner partie removing apparatus similar to an apparatus of the present invention.

However, the prior art of the official gazette and the technique of the document published in the society do not suppose a case wherein conductive water is mixed. For example, in the document published in the society, where water is contained in recovered carrier liquid, the difference in specific gravity between the carrier liquid and the water is utilized to separate the water. According to the method, however, not only a large-scale apparatus is required, but long time is inevitably required for the separation.

The present invention has been made in view of the subjects described above, and it is an object of the present invention to provide a waste liquid regeneration apparatus and a waste liquid regeneration method for a printer by which regeneration of cleaning liquid can be performed in a high efficiency to achieve reduction of the disposal cost for cleaning waste liquid and the running cost required for cleaning of the printer and besides improvement in productivity of the printer.

DISCLOSURE OF THE INVENTION

In order to attain the object described above, the present invention adopts the following measures.

According to the present invention, a waste liquid regeneration apparatus for a printer is characterized in that the liquid regeneration apparatus comprises a vessel into which waste liquid containing ink pigment, water and cleaning fluid used in the printer is supplied, a metal electrode plate (for example, in the form of a wire mesh) disposed in the vessel for partitioning the inside of the vessel into a first chamber and a second chamber and for allowing the waste liquid to flow therethrough, a high-voltage power supply for applying a voltage to the metal electrode plate, and a grounding electrode connected to the first chamber. With the waste liquid regeneration apparatus, an electrostatic field is generated in the waste liquid such that electrophoresis of the ink pigment by the electrostatic field can be utilized to electrostatically agglomerate the water and the ink pigment from within the waste liquid to separate the waste liquid into the cleaning liquid and the water and ink pigment. Accordingly, regeneration of the cleaning liquid can be performed in a high efficiency, and the disposal cost for the cleaning waste liquid can be reduced and the running cost required for cleaning of the printer can be reduced. As a result, improvement of the productivity of the printer can be achieved.

The number of metal electrode plates is not limited to one, and one or a plurality of additional metal electrode plates for allowing the waste liquid to flow therethrough may be provided. In this instance, the metal electrode plates are disposed in a juxtaposed and spaced relationship with from each other such that each of the metal electrode plates partitions the second chamber. Further, the high-voltage power supply is connected to each of the metal electrode plates inuding the metal electrode plate which partitions the inside of the vessel into the first chamber and second chamber.

Where a plurality of metal electrode plates are provided, a higher voltage is applied to any of the metal electrode plates as the distance from the grounding electrode to the metal electrode plate increases. Or, a voltage is applied to each of the metal electrode plates from a corresponding one of the high-voltage power supplies such that a higher field intensity is generated by the metal electrode plate as the distance from the grounding electrode to the metal electrode plate decreases. With the configurations, the ink pigment can be agglomerated and attracted with certainty to the grounding electrode plate, and the waste liquid regeneration performance is improved.

Preferably, a waste liquid supplying pipe for supplying the waste liquid is connected to the first chamber, and a cleaning fluid recovering pipe for recovering the regenerated cleaning fluid is connected to the second chamber. With the configuration, supply of the waste liquid and recovery of the cleaning liquid can be performed smoothly. Particularly where the waste liquid supplying pipe and the cleaning fluid recovering pipe are connected to a blanket drum cleaning apparatus for cleaning a blanket drum of the printer such that the waste liquid discharged from the blanket drum cleaning apparatus is supplied to the first chamber through the waste liquid supplying pipe and the cleaning fluid regenerated in the second chamber is recovered by the blanket drum cleaning apparatus through the cleaning fluid recovering pipe, while regeneration of the waste liquid is carried out, the regenerated cleaning liquid can be utilized to clean the blanket drum. Consequently, the operability is improved remarkably.

While various arrangements of the grounding electrode and the metal electrode plates are possible, the grounding electrode may be disposed substantially horizontally at a lower portion of the inside of the vessel, and the metal electrode plate or plates may be disposed substantially horizontally above the grounding electrode in the vessel. With the configuration, of the cleaning liquid, ink pigment and water separated from the waste liquid, the cleaning liquid stays above the metal electrode plate or plates while the ink pigment and the water stay in the proximity of the grounding electrode below the metal electrode plate or plates. Therefore, recovery of the cleaning liquid, ink pigment and water can individually be performed readily, and reuse of the cleaning liquid and disposal of the water and the ink pigment can be performed readily and smoothly.

In this instance, a partition wall may be disposed in the proximity of a first side wall of the inside of the vessel while the metal electrode plate or plates are disposed between a second side wall opposing to the first sidewall and the partition wall. With the configuration, the waste liquid supplying pipe for supplying the waste liquid can be connected to a region defined by the partition wall and the first side wall, and the cleaning fluid recovering pipe for recovering the regenerated cleaning fluid can be connected to another region surrounded by the metal electrode plate or plates, the second side wall and the partition wall. Thus, both of the waste liquid supplying pipe and the cleaning liquid recovering pipe can be connected to an upper portion of the vessel.

The waste liquid regeneration apparatus for a printer may further comprise a scraping plate for scraping off ink pigment agglomerated on and adhering to the grounding electrode to remove the ink pigment from the grounding electrode. With the configuration, the regeneration process for the cleaning waste liquid can be performed without exchanging the electrodes. Further, the grounding electrode may be mounted for extraction to the outside of the vessel. With the configuration, recovery and disposal of the ink pigment can be performed further readily.

The grounding electrode may be formed as a metal sheet (for example, aluminum foil) which can be taken up in a coiled form. In this instance, where the waste liquid regeneration apparatus for a printer further comprises a delivering apparatus disposed outside the vessel for delivering the metal sheet and a take-up apparatus provided outside the vessel for taking up the metal sheet after the metal sheet is delivered from the delivering apparatus and used in the vessel, recovery and disposal of the ink pigment can be performed further readily and contribution also to prevention of contamination of the inside of the vessel and purification of the cleaning liquid to be reused is achieved.

The waste liquid regeneration apparatus for a printer may further comprise thin paper in the form of a roll for covering a surface of the grounding electrode, a delivering apparatus for delivering the thin paper from the outside to the inside of the vessel, and a take-up apparatus for taking up the thin paper after the thin paper is used in the vessel. Meanwhile, the grounding electrode may be formed as a rotatable metal bar having a cylindrical shape, and the metal electrode plate or plates may be formed in a cylindrical shape so as to surround the outside of the grounding electrode. In this instance, preferably the waste liquid regeneration apparatus for a printer further comprises a blade provided in sliding contact with the metal bar for scraping off ink pigment adhering to the outside surface of the metal bar. As an alternative, the grounding electrode may be formed as a rotatable metal disc, and a blade may be provided in sliding contact with the metal disc for scraping off the ink pigment adhering to the outside surface of the metal disc. Further, the grounding electrode may be formed as an endless metal sheet, and the waste liquid regeneration apparatus for a printer may further comprise a driving apparatus for driving the endless metal sheet to rotate, and a blade provided in sliding contact with the metal sheet for scraping off the ink pigment adhering to the outside surface of the metal sheet. With any of the configurations described, recovery and disposal of the ink pigment can be performed further readily and contribution also to prevention of contamination of the inside of the waste liquid reserving vessel and purification of the cleaning liquid to be reused is achieved.

The grounding electrode may be formed from an electrically-conductive protuberance or a network-like metal member. With the configuration, the grounding electrode is less likely to be influenced by a counter electric field, and there is no possibility that the ink pigment adhering once may dissolve into the liquid layer in the vessel. Consequently, maintenance-free use of the apparatus for a long period of time can be anticipated. In this instance, where the waste liquid regeneration apparatus for a printer further comprises an ultrasonic oscillation apparatus for applying oscillation to the grounding electrode to re-resolve the ink pigment adhering to the grounding electrode into the cleaning fluid, removal of the adhering ink pigment can be performed more readily.

As a more preferred form of the waste liquid regeneration apparatus of the present invention, the metal electrode plate or plates are disposed horizontally or substantially horizontally in the vessel to form the first chamber below the second chamber, and a third chamber for reserving the water below the first chamber is provided in a spaced relationship from the metal electrode plate or plates and the grounding electrode is connected to the third chamber. With the configuration, since an electric field is generated between the metal electrode plate and the water interface in the third chamber, the regenerated cleaning liquid from within the separated waste liquid in the first chamber moves into the second chamber while the regenerated water settles in the third chamber and the ink pigment agglomerates to the water interface. Consequently, the regenerated cleaning liquid, the regenerated water and the ink pigment are separated from one another with certainty.

In this instance, a waste liquid supplying pipe for supplying the waste liquid is connected to the first chamber and a cleaning fluid recovering pipe for recovering the regenerated cleaning fluid is connected to the second chamber, and a regenerated water recovering pipe for recovering the regenerated water is connected to a portion higher than a bottom portion in the third chamber and a remaining liquid recovering pipe for recovering remaining liquid in the vessel is connected to the bottom of the third chamber. With the configuration, the regenerated cleaning liquid, the regenerated water and the ink pigment can be recovered individually with certainty.

Preferably, at least one of the cleaning fluid recovering pipe, regenerated water recovering pipe and remaining liquid recovering pipe is connected to a returning flow path connecting to the first chamber so that at least one of the regenerated cleaning fluid, regenerated water and remaining liquid may be returned to the first chamber. With the configuration, the regenerated cleaning fluid, regenerated water or remaining liquid can be reused readily, and the cleaning liquid can be saved and the labor for reuse can be eliminated.

Preferably, the third chamber is formed in a funnel-shape. More preferably, the third chamber has an inner face soil release processed for preventing adhering of the ink pigment thereto. With the configuration, recovery of the ink pigment from the third chamber can be performed readily.

In the waste liquid regeneration apparatus of the present invention, as a waste liquid supplying method for a waste liquid supplying apparatus for supplying the waste liquid into the first chamber, preferably an intermittent supplying method wherein supplying and stopping of the waste liquid are performed alternately is used for operation of the waste liquid supplying apparatus.

Where a waste liquid regeneration apparatus of the type which utilizes an electrostatic field as in the present invention uses not a continuous supplying method but an intermittent supplying method as the waste liquid supplying method for a waste liquid supplying apparatus, during stopping of the supply of the waste liquid, the ink pigment in the first chamber electrically migrates and agglomerates to the interface of the water in the third chamber and the purity of the cleaning liquid in the first chamber gradually rises. Therefore, even if the supply of the waste liquid to the first chamber is resumed and a flow of the cleaning liquid from the first chamber to the second chamber is generated, the ink pigment is prevented from flowing into the second chamber passing through the metal electrode plate or plates together with the cleaning liquid. Further, in the continuous supplying method, it is necessary to supply the waste liquid slowly at a low speed so that the ink pigment may not be pushed out through the metal electrode plate or plates to the second chamber. In contrast, however, in the intermittent supplying method, for a period of time until the ink pigment diffuses in the first chamber as a result of the supply of the waste liquid to lower the purity of the cleaning liquid in the first chamber, the waste liquid can be supplied at a high supplying speed. Accordingly, with the intermittent supplying method, a high processing capacity can be obtained as a whole when compared with the continuous supplying method, and the regeneration processing time can be reduced while the purity of the cleaning liquid is maintained.

It is to be noted that, although the supplying speed, supplying time and stopping time of the waste liquid in the intermittent supplying method described above may be set as fixed values taking a result of an experiment or the like into consideration, preferably they are varied using the following method after initial values for them are set. In particular, a physical amount (for example, the transmission factor of the regenerated cleaning liquid) correlated with the concentration of the ink pigment in the regenerated cleaning fluid separated from the waste liquid in the first chamber and recovered into the second chamber or the concentration of the ink pigment in the regenerated cleaning fluid is detected by a detection apparatus (first detection apparatus). Then, at least one of a supplying rate, supplying time and stopping time of the waste liquid by the waste liquid supplying apparatus is controlled by a control apparatus in response to a result of the detection of the detection apparatus so that the concentration of the ink pigment in the regenerated cleaning fluid may remain within a predetermined control range. Although optimum values of the supplying speed, supplying time and stopping time in the intermittent supplying method vary depending upon the concentration of the waste liquid and so forth, where the ink pigment concentration of the regenerated cleaning liquid is fed back in this manner, the purity of the regenerated cleaning liquid can always be maintained.

Preferably, the waste liquid supplying apparatus further allows operation thereof in accordance with a continuous supplying method wherein the waste liquid is supplied continuously in addition to the intermittent supplying method and is configured for changing over between the intermittent supplying method and the continuous supplying method. The waste liquid is a mixture of the ink pigment, water and cleaning liquid, and while it is stored, the water and the cleaning liquid separate upwardly and downwardly from each other due to the difference in specific gravity. Therefore, waste liquid which contains water as a major component is sometimes supplied, and in such an instance, even if the waste liquid is supplied continuously, the purity of the cleaning liquid in the first chamber does not drop. Further, even if the waste liquid is supplied at a high supplying speed, the possibility that the ink pigment may flow into the second chamber passing through the metal electrode plate or plates together with the cleaning liquid is low. Accordingly, where the waste liquid contains the cleaning liquid as a major component in which the ink pigment is mixed, such an intermittent supplying method as described above is used, but where the waste liquid contains the water as a major component, the operation method can be changed over from the intermittent supplying method to the continuous supplying method to raise the processing capacity. Consequently, the regeneration processing time can be further reduced as a whole.

In this instance, although the changeover between the intermittent supplying method and the continuous supplying method may be performed by manual operation, preferably the following method is used to perform automatic changeover. In particular, a physical amount correlated with the concentration of the water in the waste liquid supplied into the first chamber by the waste liquid supplying apparatus or the concentration of the water in the waste liquid is detected by a detection apparatus (second detection apparatus). Then, the waste liquid supplying method of the waste liquid supplying apparatus is changed over in response to a result of the detection of the detection apparatus by a changeover apparatus such that, when the concentration of the water in the waste liquid is within a predetermined range, the waste liquid supplying apparatus is operated in accordance with the intermittent supplying method, but when the concentration of the water in the waste liquid is outside the predetermined range, the waste liquid supplying apparatus is operated in accordance with the continuous supplying method. Where the automatic changeover is performed in this manner, the waste liquid supplying system can be changed over precisely, and the processing capacity as a whole can be further raised to further reduce the regeneration processing time.

BRIEF DESCRIPTION OF THE DRAWINGS

FIG. 3 is a schematic view illustrating a principle of the waste liquid regeneration apparatus for a printer and a waste liquid regeneration method for a printer as the first embodiment of the present invention;

FIG. 4($b$) is a graph illustrating a potential difference in the waste liquid reserving vessel corresponding to the position on the transverse section of the waste liquid reserving vessel of FIG. 4($a$);

FIG. 7($b$) is a schematic sectional view as viewed in a sideward direction of the waste liquid reserving vessel of FIG. 7($a$);

FIG. 16($b$) is a schematic sectional view as viewed in a sideward direction of a waste liquid reserving vessel;

FIG. 17($a$) is a schematic sectional view showing a waste liquid regeneration apparatus for a printer as an eighth embodiment of the present invention as viewed in a sideward direction of a waste liquid reserving vessel;

FIG. 17($b$) is a sectional view taken along line D-D of FIG. 17($a$);

FIG. 18($b$) is a schematic sectional view as viewed in a sideward direction of a waste liquid reserving vessel;

FIG. 25($b$) is a schematic sectional view as viewed in a sideward direction of FIG. 25($a$);

BEST MODE FOR CARRYING OUT THE INVENTION

In the following, embodiments of the present invention are described with reference to the drawings.

Figure 1:
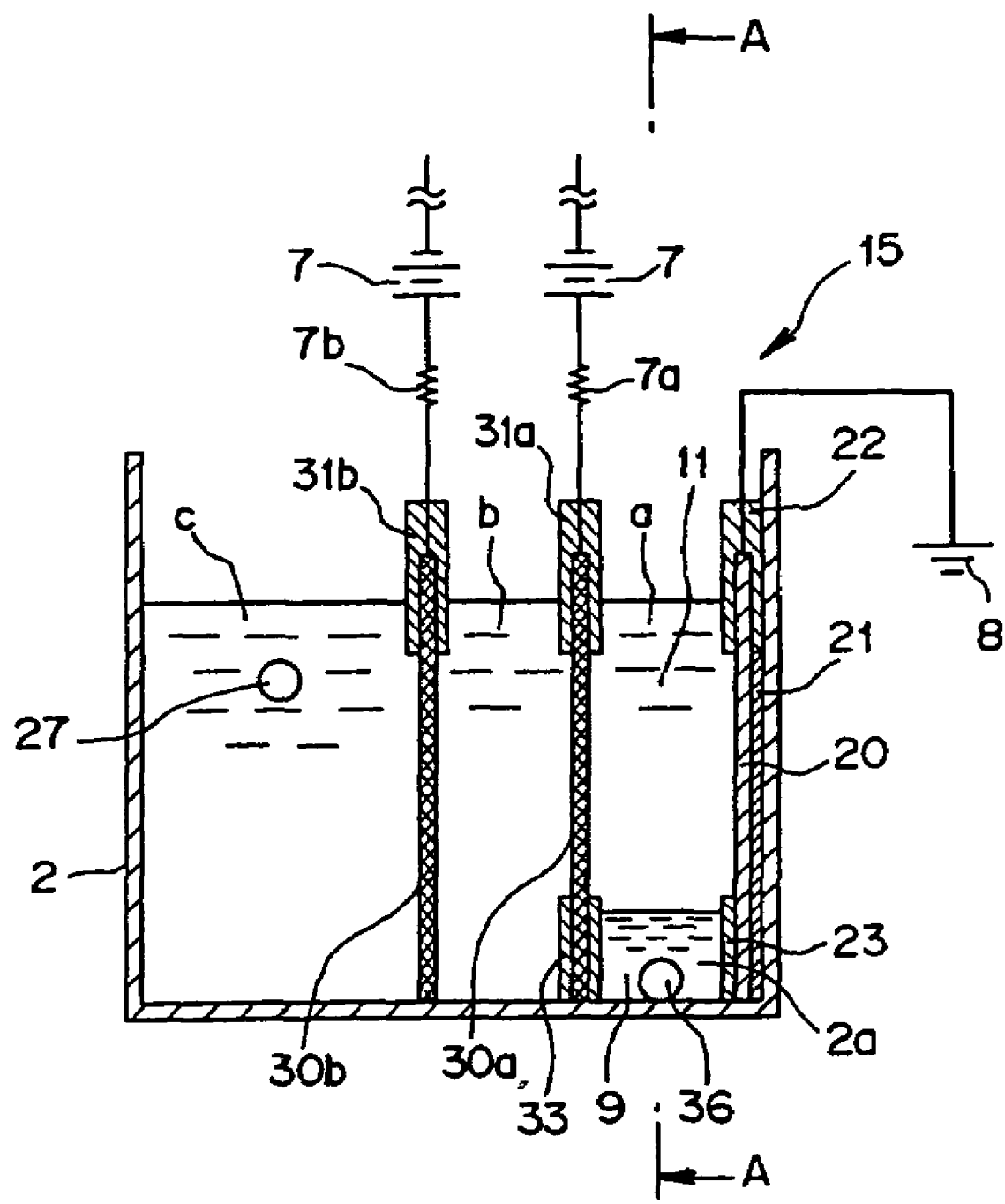
FIG. 1 is a vertical sectional view of a waste liquid reserving vessel showing a waste liquid regeneration apparatus for a printer as a first embodiment of the present invention and is a sectional view taken along line B-B of FIG. 2.
Figure 2:
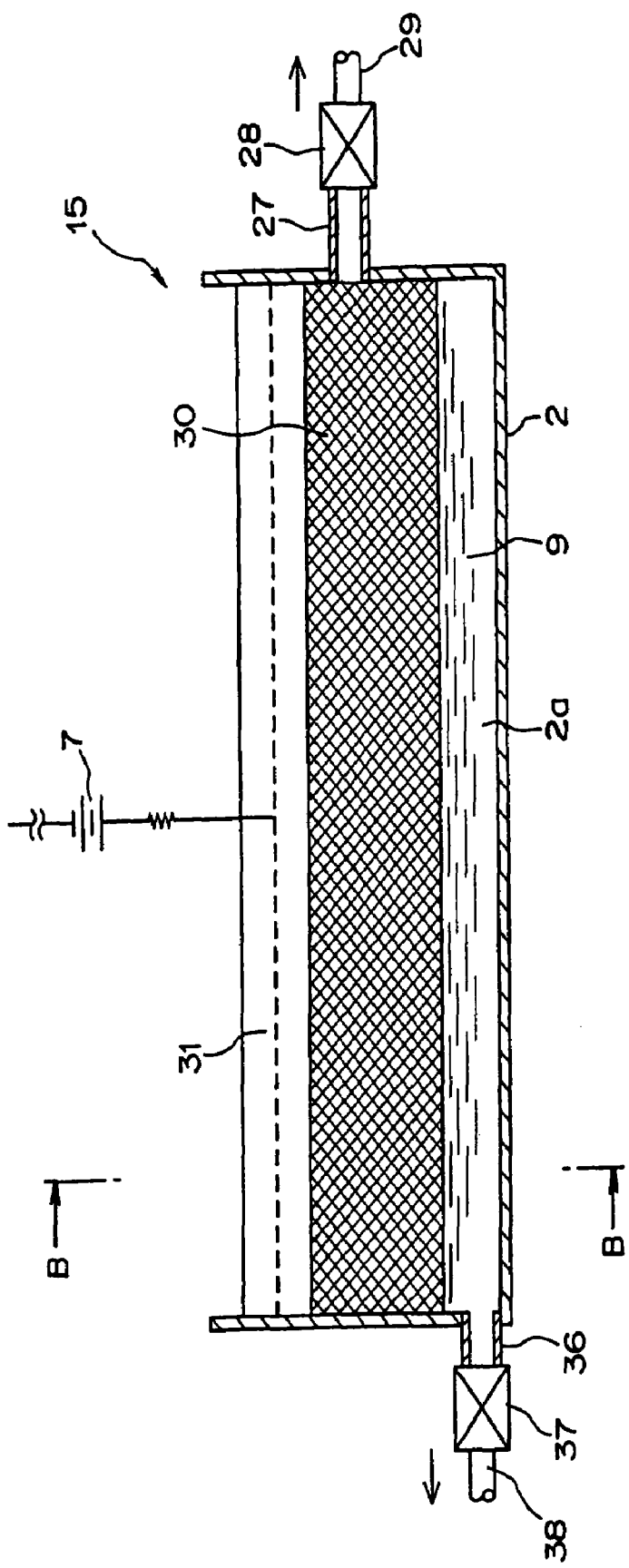
FIG. 2 is a transverse sectional view of the waste liquid reserving vessel showing the waste liquid regeneration apparatus for a printer as the first embodiment of the present invention and is a sectional view taken along line A-A of FIG. 1.
Figure 4A:
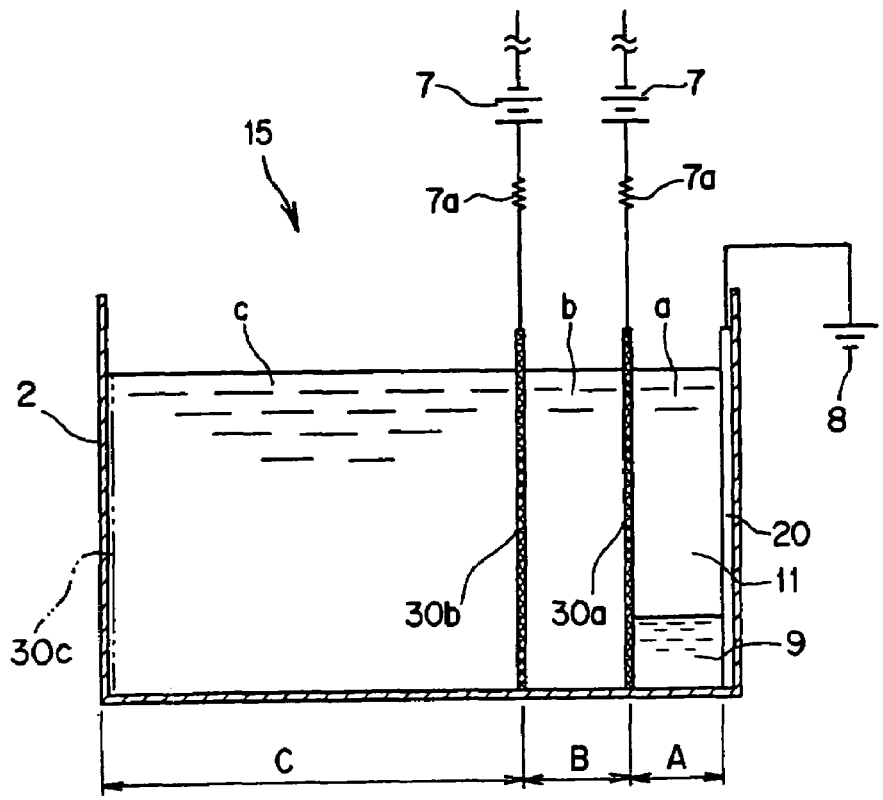
FIG. 4($a$) is a transverse sectional view of the waste liquid reserving vessel showing the waste liquid regeneration apparatus for a printer as the first embodiment of the present invention.
Figure 4B:
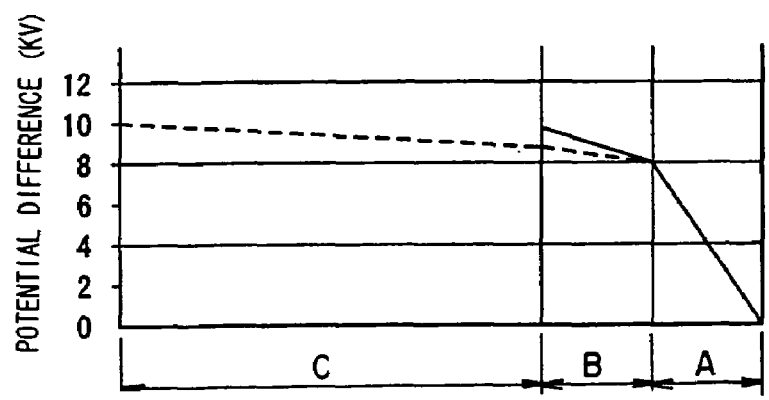
Figure 5:
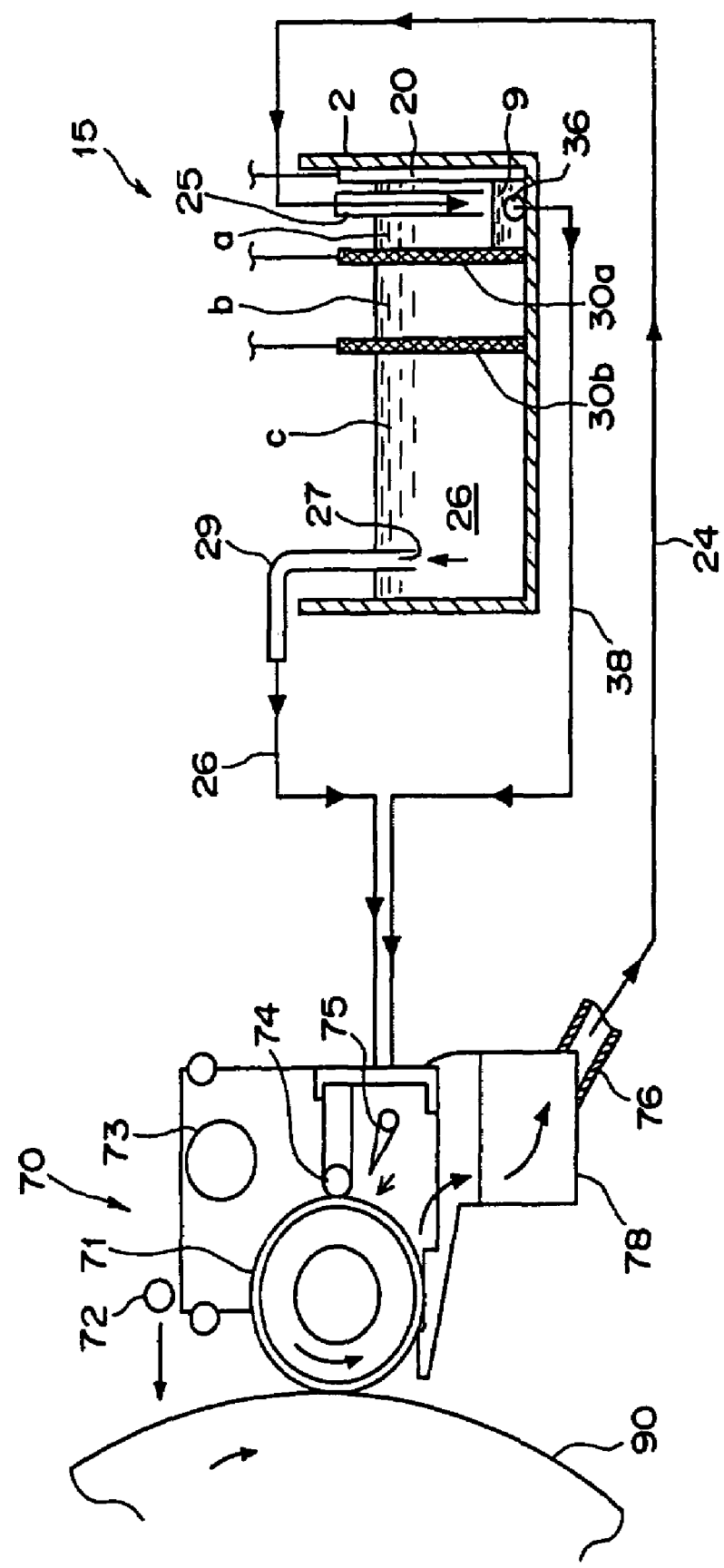
FIG. 5 is a view of a system configuration showing the waste liquid regeneration apparatus for a printer as the first embodiment of the present invention in a state wherein it is assembled in a cleaning apparatus.
Figure 6:
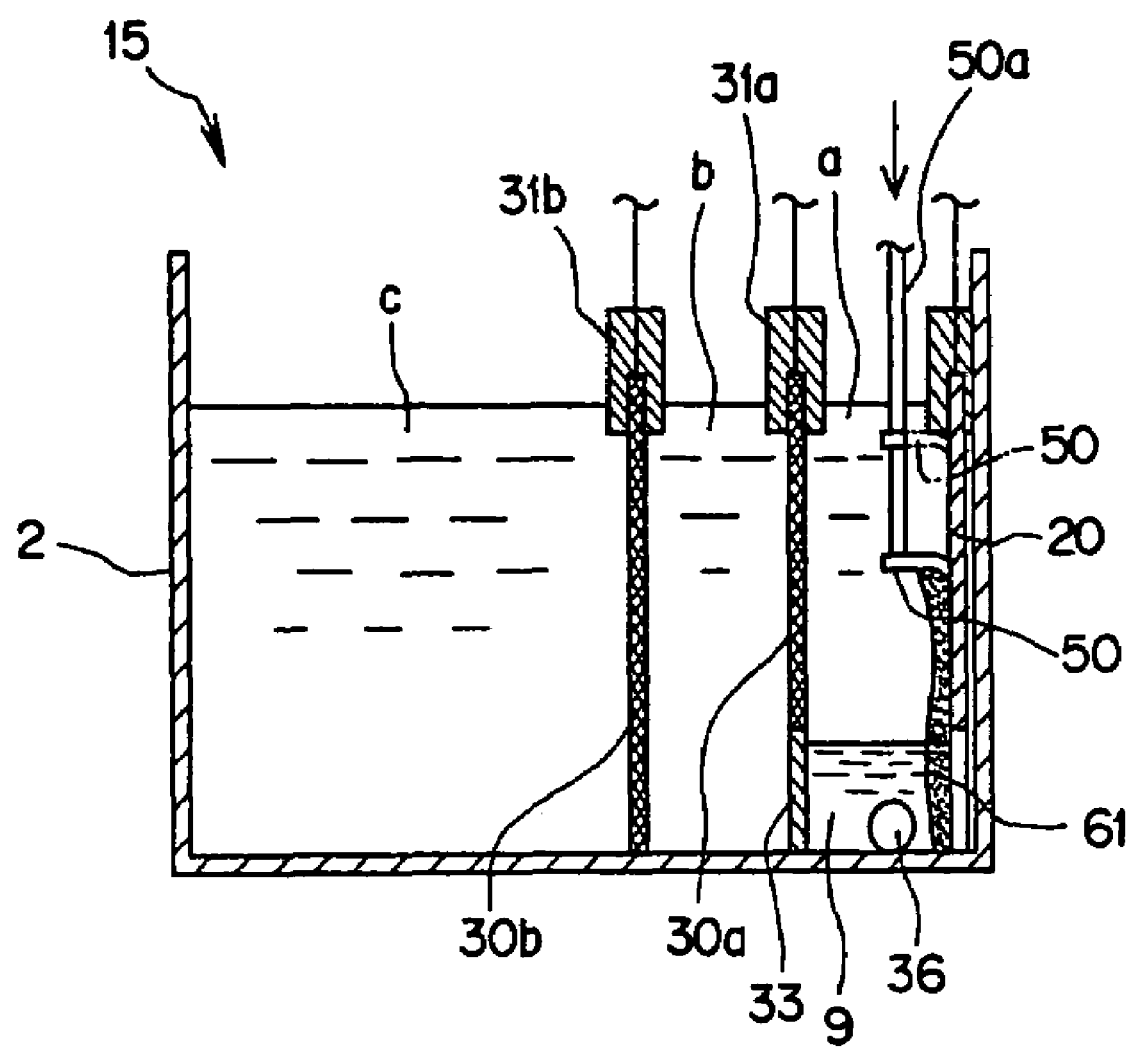
FIG. 6 is a transverse sectional view of the waste liquid reserving vessel illustrating an example of a technique for removing ink pigment adhering to a grounding electrode plate in the waste liquid regeneration apparatus for a printer as the first embodiment of the present invention.

A first embodiment of the present invention is described. FIGS. 1 to 6 shows a waste liquid regeneration apparatus and a waste liquid regeneration method for a printer as the first embodiment of the present invention, and wherein FIGS. 1 and 2 are a vertical sectional view and a transverse sectional view of a waste liquid reserving vessel showing a configuration of the apparatus; FIG. 3 is a schematic view illustrating a principle of the apparatus and the method; FIGS. 4(a) and 4(b) are views showing a configuration of the apparatus; FIG. 5 is a view of a system configuration showing the apparatus in a state wherein it is assembled in a cleaning apparatus; and FIG. 6 is a view illustrating an example of a technique for removing ink pigment adhering to a grounding electrode plate in the apparatus.

First, a waste liquid regeneration principle of the waste liquid regeneration apparatus and the waste liquid regeneration method is described. According to the waste liquid regeneration principle, in regeneration of waste liquid 11 which contains three components of ink pigment 61, water 9 and (insulating) cleaning liquid 62, an electrostatic field is generated in the waste liquid 11 to cause the ink pigment 61 to electrically migrate in the waste liquid and cause the water 9 to electrostatically agglomerate thereby to separate the ink pigment 61, water 9 and cleaning liquid 62 from one another.

In particular, while the waste liquid 11 supplied in the vessel contain the water 9, ink pigment 61 and cleaning liquid 62 in a mixed state therein as illustrated in X1 of FIG. 3, if electrode plates 3 and 4 are disposed on one side and the other side in the waste liquid 11 and the electrode plate 3 is grounded so as to act as a grounding electrode (here, since the grounding electrode is in the form of a plate, it is hereinafter referred to also as grounding electrode plate) while a high voltage is applied to the electrode plate 4, then the electrode plate 4 serves as the + pole while the electrode plate 3 serves as the − pole and an electric field is generated between the electrode plates 3 and 4. As a result, electrophoresis of the ink pigment 61 in the waste liquid 11 and electrostatic agglomeration of the water 9 are started as seen in X2 of FIG. 3, and the water 9 and the ink pigment 61 move individually and separately so that they are separated from each other.

As the reaction in the electric field proceeds (that is, as the state wherein the electric field is generated continues for long time), the water 9 and the ink pigment 61 separate fully from each other, and the water 9 agglomerates into a mass and settles to the bottom by the gravity as seen in X3 of FIG. 3. Meanwhile, the ink pigment 61 having the + charge adheres to the grounding electrode plate 3 serving as the − pole. Consequently, the water 9 and the ink pigment 61 are separated fully from the cleaning liquid 62, and the clean cleaning liquid 62 (that is, regenerated cleaning liquid 26) is obtained.

FIG. 4(a) is a schematic view showing a more materialized apparatus configuration for making use of such a principle as described above to perform waste liquid regeneration. Referring to FIG. 4(a), a grounding electrode plate 20 in the form of a plate is installed such that it extends along a side face on one side in a waste liquid reserving vessel (which may be hereinafter referred to simply as vessel) 2. A first application electrode plate (which may be hereinafter referred to simply as electrode plate) 30a is installed at a point spaced by a distance A from the grounding electrode plate 20 in the vessel 2 such that it extends in parallel to the grounding electrode plate 20. Further, a second application electrode plate 30b is installed at a point spaced by a distance B from the electrode plate 30a in the vessel 2 such that it extends in parallel to the grounding electrode plate 20 and the electrode plate 30a.

Accordingly, the inside of the vessel 2 is partitioned into three regions from one side to the other side of the vessel 2 inuding a first region (which is a waste liquid loading layer and is referred to also as a first layer) a, a second region (which is a processing layer and is referred to also as a second layer) b and a third region (which is a processed layer and is referred to also as a third layer) c. However, since the electrode plates 30a and 30b are both wire mesh type metal electrode plates each formed from a net-shaped metal plate (for example, a wire gauze of 200 meshes), the waste liquid 11 can circulate between the regions a, b and c.

The agglomerating grounding electrode plate 20 for agglomerating the ink pigment 61 is connected to the ground 8. Meanwhile, the electrode plates 30a and 30b are connected to a high-voltage power supply (hereinafter referred to merely as power supply) 7 through voltage loads (electric resistors) 7a and 7b different from each other so that different voltages may individually be applied to the electrode plates 30a and 30b.

In the beginning, clean cleaning liquid 62 is supplied into the vessel 2. Further, a high voltage of approximately 8 kV (kilovolt) is applied to the first application electrode plate 30a while another high voltage of approximately 10 kV higher than the first-mentioned high voltage is applied to the second application electrode plate 30b.

Consequently, within the first region a, a potential difference of 8 kV is produced between the moving grounding electrode plate 20 and the first application electrode plate 30a, and due to the potential difference, the ink pigment 61 in the waste liquid 11 is attracted toward the grounding electrode plate 20 while the water 9 agglomerates and settles to the bottom. However, full separation is difficult only in the first region a.

In contrast, the waste liquid 11 in which part of the ink pigment 61 remains passes through the electrode plate 30a in the form of a wire gauze and moves to the second region b. In the second region b, a potential difference of 2 kV is produced between the first application electrode plate 30a and the second application electrode plate 30b. Consequently, the part of the ink pigment 61 remaining in the waste liquid 11 agglomerates toward the first application electrode plate 30a and further agglomerates from the first application electrode plate 30a toward the grounding electrode plate 20 having a greater potential difference.

As a result, the ink pigment 61 is all agglomerated and attracted to the grounding electrode plate 20 while the water 9 settles to the bottom in the vessel 2. Then, the water 9 and the ink pigment 61 are recovered into the first region a on the right side of the vessel 2 while only the cleaning liquid 62 which has been cleaned is stored into the third region (processed layer) c on the left side of the vessel 2. The cleaning liquid 62 in the third region c can be recovered and reused.

However, if the voltage gradient (potential difference gradient) is very moderate, then the electric field becomes weak, and this slows down the movement of the ink pigment 61 toward the electrode on the lower potential side and the agglomeration of the water 9 and makes separation of them difficult. Therefore, it is necessary to provide a sufficient potential difference between the electrode plates or not to make the distance between the electrode plates very great. Further, in order to agglomerate and attract the ink pigment 61 to the grounding electrode plate 20 with certainty, it is necessary to make the electric field definitely stronger (to make the voltage gradient steeper) toward the grounding electrode plate 20.

In particular, if the distance between the two electrode plates 30a and 30b is set to the comparatively short distance B and then the voltage of 8 kV is applied to the first application electrode plate 30a while the voltage of 10 kV is applied to the second application electrode plate 30b as described hereinabove, then the potential difference between the first application electrode plate 30a and the second application electrode plate 30b is 2 kV and a sufficient voltage gradient is assured as indicated by a solid line in FIG. 4(b). Besides, since the electric field apparently exhibits a higher strength toward the grounding electrode plate 20, separation of the ink pigment 61 and the water 9 from each other can be performed with certainty.

However, if the third application electrode plate 30c is provided on the other wise within the vessel 2 [at the left end in FIG. 4(a) remotely from the grounding electrode plate 20] and, for example, a voltage of 8 kV is applied to the first application electrode plate 30a while another voltage of 9 kV is applied to the second application electrode plate 30b and a further voltage of 10 kV is applied to the third application electrode plate 30c, then the voltage gradient is moderate and the electric field is weak in the second region b and the third region c as indicated by a broken line in FIG. 4(b). Further, although the electric field in the second region b is stronger than that in the third region c, the difference in strength between them is small. Consequently, the ink pigment 61 is attracted by the electric field acting in the third region c and moves also into the third region c. Therefore, full separation cannot be anticipated.

The various embodiments of the present invention are configured from such a point of view, and the waste liquid regeneration apparatus for a printer according to the first embodiment is configured in such a manner as seen in FIGS. 1 and 2.

In particular, as shown in FIGS. 1 and 2, in the regeneration apparatus 15 shown, a grounding electrode plate 20 for agglomerating ink pigment is disposed on one side in a vessel 2 (at the right end in FIG. 1). An insulating member 21 is interposed between the grounding electrode plate 20 and a wall of the vessel 2, and an upper portion of the grounding electrode plate 20 is coated with another insulating member 22 to prevent otherwise possible occurrence of short-circuiting between the grounding electrode plate 20 and any other electrode plate.

At a position rather near to the grounding electrode plate 20 in the vessel 2, a first application electrode plate 30a is installed in parallel to the grounding electrode plate 20. Further, at another position rather near to the electrode plate 30a in the vessel 2, a second application electrode plate 30b is installed in parallel to the grounding electrode plate 20 and the electrode plate 30a. Each of the electrode plates 30a and 30b may be a wire mesh type metal electrode plate formed from a metal gauze of, for example, 200 meshes so that waste liquid 11 can circulate between regions a, b and c partitioned by the electrode plates 30a and 30b. Also upper portions of the electrode plates 30a and 30b are coated with insulating members 31a and 31b, respectively, so that occurrence of short-circuiting between the electrode plates is prevented.

A power supply 7 is connected to the application electrode plates 30a and 30b through voltage loads 7a and 7b different from each other so that different voltages from each other may be applied to the application electrode plates 30a and 30b, respectively. Naturally, sufficiently high voltages are applied to the application electrode plates 30a and 30b, and besides, a higher voltage is applied to the second application electrode plate 30b than to the first application electrode plate 30a so that the electric field generated by application of the voltage in the first region a is definitely stronger than (with a significant difference from) that in the second region b.

A lower portion of the first region a in the vessel 2 functions as a tank (settling portion) 2a to which the agglomerated and separated water 9 settles. In order to recover the water 9 settling in the vessel 2a, a recovering hole 36 is provided at a lower portion of the vessel 2. A recovering pipe 38 is connected to the recovering hole 36 through a recovering valve 37.

It is to be noted that, since the water 9 is conductive, electrode portions (lower portions of the grounding electrode plate 20 and the electrode plate 30a) in the setting portion 2a (lower portion of the first region a) into which the water 9 settles are coated with the insulating members 23 and 33 although they are not necessitated by the cleaning liquid 62 because the cleaning liquid 62 has an insulating property.

Meanwhile, a recovering hole 27 for recovering the cleaning liquid 62 therethrough is provided at an upper portion in the third region c into which the cleaning liquid 62 separated from the ink pigment 61 and the water 9 and regenerated cleanly is stored. A recovering pipe 29 is connected to the recovering hole 27 through a recovering valve 28.

The waste liquid regeneration apparatus for a printer as the first embodiment of the present invention is configured in such a manner as described above. Thus, clean cleaning liquid 62 is supplied into the vessel 2 first, and then, while the waste liquid 11 is supplied to flow into the vessel 2, a sufficiently high voltage (for example, 8 kV) is applied to the first application electrode plate 30a while a higher voltage (for example, 10 kV) than that to the first application electrode plate 30a is applied to the second application electrode plate 30b. As a result, a strong electric field is generated in the first region a, and a somewhat strong electric field is generated in the second region b although it is weaker than that in the first region a.

Consequently, in the first region a, the ink pigment 61 in the waste liquid 11 is attracted to the grounding electrode plate 20 while the water 9 agglomerates and settles to the bottom due to a sufficiently great potential difference (8 kV) between the moving grounding electrode plate 20 and the first application electrode plate 30a. The waste liquid 11 in which part of the ink pigment 61 remains passes through the first application electrode plate 30a and moves to the second region b. In the second region b, since a sufficient potential difference (2 kV) is produced between the first application electrode plate 30a and the second application electrode plate 30b, the part of the ink pigment 61 remaining in the waste liquid 11 agglomerates toward the first application electrode plate 30a and further agglomerates from the first application electrode plate 30a toward the grounding electrode plate 20 which exhibits a greater potential difference.

As a result, the ink pigment 61 is all agglomerated and attracted to the grounding electrode plate 20 while the water 9 settles to the bottom of the first region a on the right side in the vessel 2. In the third region (processed region) c on the left side of the vessel 2, only the cleaning liquid 62 which has been cleaned is stored.

Here, the recovering valve 37 is opened so that the water 9 settling on the vessel 2a in the first region a is recovered to an outside location from the recovering hole 36 through the recovering pipe 38. Further, the recovering valve 28 is opened so that the cleaning liquid 62 regenerated cleanly is recovered to the outside location from the recovering hole 27 provided at an upper portion in the third region c through the recovering valve 28. Thus, both of the water 9 and the cleaning liquid 62 are reused.

In this manner, in the system wherein the three components of the ink pigment 61, insulating cleaning liquid 62 and conductive water 9 exist in a mixed state, the three components can be separated from one another by means of a single apparatus. Besides, such separation can be performed in comparatively short time.

Incidentally, if the waste liquid regeneration apparatus 15 according to the present embodiment is incorporated into an actual cleaning apparatus of a printer to construct a system, then the system has such a configuration as shown in FIG. 5.

As shown in FIG. 5, in the cleaning apparatus 70 shown, a cleaning roller 71 is pressed against a rotating blanket drum 90 shown on the left side in FIG. 5, and cleaning liquid 62 supplied from the regeneration apparatus 15 is sprayed from below by a cleaning fluid nozzle 75. Consequently, the cleaning liquid 62 jetted from the nozzle 75 cleans the blanket drum 90 through a blade 74 and the cleaning roller 71.

The waste liquid 11 after used for the cleaning is accumulated into a recovering tank 78 provided at a lower location and is fed to the regeneration apparatus 15 through a pipe 76. It is to be noted that reference numeral 72 in FIG. 5 denotes a drying nozzle for a blanket drum, and 73 an air motor. However, they are not necessary arties to the present invention.

The regeneration apparatus 15 shown on the right side in FIG. 5 is the waste liquid regeneration apparatus for a printer according to the present embodiment described hereinabove, and like reference characters to those of FIGS. 1 and 2 denote like elements and detailed description of them is omitted herein.

The waste liquid 11 from the cleaning apparatus 70 is fed from the pipe 76 into a pipe 24 and further from a supplying pipe 25 into the first region (waste liquid supplying region) a in the vessel 2. Then, in the regeneration apparatus 15, from within the waste liquid 11 in which the three components of the ink pigment 61, insulating cleaning liquid 62 and conductive water 9 exist in a mixed state, the three components are separated as described hereinabove. Then, the regenerated cleaning liquid 26 regenerated by the regeneration apparatus 15 is sucked up from the recovering hole 27 provided in the third region (processed layer) c of the vessel 2 through the recovering pipe 29 and supplied as cleaning liquid 62 toward the cleaning fluid nozzle 75 of the cleaning apparatus 70.

Meanwhile, the water 9 settling to a lower portion of the first region (waste liquid supplying region) a is supplied through the recovering hole 36 and the recovering pipe 38 toward the cleaning fluid nozzle 75 of the cleaning apparatus 70 similarly to the regenerated liquid 26. Then, the water 9 and the regenerated liquid 26 (cleaning liquid 62) fed into the cleaning apparatus 70 are fed to the cleaning fluid nozzle 75 and then jetted from the nozzle 75 to the cleaning roller 71 so that they are used for cleaning of the blanket drum 90.

Thereafter, the cye described above can be repeated to perform continuous regeneration of cleaning waste liquid and cleaning of a blanket drum with the thus regenerated cleaning liquid. In this manner, it becomes possible to perform regeneration of the cleaning liquid 62 in a high efficiency, and since the disposal cost for the waste liquid 11 can be reduced and the running cost required for cleaning of the printer can be reduced, improvement of the productivity of the printer can be anticipated.

It is to be noted that the ink pigment 61 agglomerated and attracted to the grounding electrode plate 20 by electrostatic migration necessitates removal thereof from the grounding electrode plate 20. As a countermeasure for the removal, various methods are available, and for example, such a technique as illustrated in FIG. 6 may be used. It is to be noted that like reference characters to those in FIGS. 1 and 2 denote like elements, and description of them is omitted herein.

Referring to FIG. 6, the technique shown uses a scraping jig. The scraping jig inudes a slide bar 50a driven by a cylinder, a motor or a like element not shown to slidably move along the surface of the grounding electrode plate 20 and a scraping plate 50 securely mounted at an end of the slide bar 50a. The slide bar 50a is operated to move the scraping plate 50 along the surface of the grounding electrode plate 20 to scrape off ink pigment 61 adhering to the surface of the grounding electrode plate 20 downwardly. Consequently, a regeneration process for cleaning waste liquid can be performed without exchanging any electrode. It is to be noted that, during a scraping off process, the scraping plate 50 stands by above the location.

A waste liquid regeneration test was conducted using the regeneration apparatus of the present embodiment, and description of it is given below.

First, as apparatus conditions, the volume (liquid reservation amount) of the vessel 2 was set to 600 cc; the inter-electrode distance (distance A shown in FIGS. 4(a) and 4(b)) between the grounding electrode plate 20 and the first application electrode plate 30a to 20 mm; the inter-electrode distance (distance B shown in FIGS. 4(a) and 4(b)) between the first application electrode plate 30a and the second application electrode plate 30b to 20 mm; and the inter-electrode distance between the second application electrode plate 30b and the other end of the vessel 2 to 20 mm. As voltage load conditions, a voltage of 8 kV was applied to the first application electrode plate 30a, and another voltage of 10 kV was applied to the second application electrode plate 30b. As waste liquid, sheet ink [for example, HYECOO MZ (Toyo Ink), CERVO Y (Tokyo Ink), GEOS-GN (DaiNippon Ink)] was used as waste liquid. Further, as cleaning liquid, for example, Auto-clean (Nikken Chemicals), Blaclean S (Nikka) or Print cleaner (Toyo Ink) was used. Then, dummy waste liquid was produced by diluting the ink to 1% with the cleaning liquid to produce solution and further adding water by 20% to the solution, and the dummy waste liquid was poured by 100 cc into the first region a of the apparatus and a regeneration test was performed.

The test performed in the conditions given above exhibited the following results.

① First, the water separated and settled, and the ink adhered to the grounding electrode.

② When the clean cleaning liquid in the third region c was recovered, no flowage of the waste liquid from the second region b into the third region c was found.

③ The time required for the regeneration was 400 to 600 seconds.

④ Where the inter-electrode distance was reduced from 20 mm to 10 mm, the time required for regeneration was reduced to ¼. However, a defect that the flowage of the waste liquid between the regions became difficult or removal of the ink adhering to the grounding electrode plate 20 became difficult occurred.

From the test results, it has become apparent that, although the time required for regeneration possibly varies or the ink flowage condition between the layers possibly differs depending upon the inter-electrode plate distance (distance between the regions), water and ink separate and agglomerate and clean cleaning liquid can be recovered in all conditions.

Consequently, if appropriate conditions (the distance between electrodes, the volume of each region, potential difference distribution and so forth) are set in accordance with the volume of the vessel, then cleaning waste liquid can be separated fully into water and ink pigment, and cleaning liquid.

Incidentally, although, in the first embodiment described above, the ink pigment 61 adhering to the surface of the grounding electrode plate 20 can be scraped off downwardly by the scraping plate 50, the scraped off ink pigment dro to the deepest location and accumulates in the inside of the storage tank for the water 9 and so forth. Therefore, it is necessary to periodically perform cleaning to remove the ink pigment 61 in the storage layer.

Further, if installation of an apparatus for removing the ink pigment 61 from the grounding electrode plate 20 such as the scraping plate 50 and so forth and the scraping step and the removing step for ink pigment are taken into consideration, then it is estimated that the cost and time required for removal of the separated ink pigment may become a burden.

Therefore, the following embodiments have been devised so that regeneration of waste liquid can be performed in a high efficiency and besides reduction of the apparatus cost and the running cost required for removal and disposal of the separated ink pigment and improvement of the productivity of a printer can be achieved.

Figure 7A:
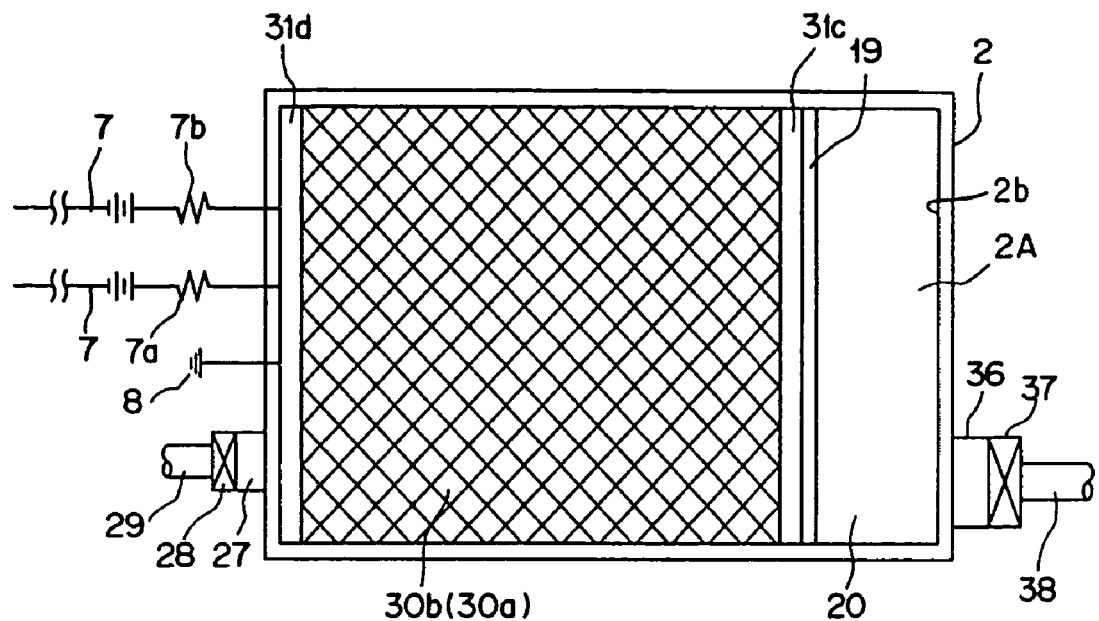
FIG. 7($a$) is a schematic plan view of a waste liquid reserving vessel showing a waste liquid regeneration apparatus for a printer as a second embodiment of the present invention.
Figure 7B:
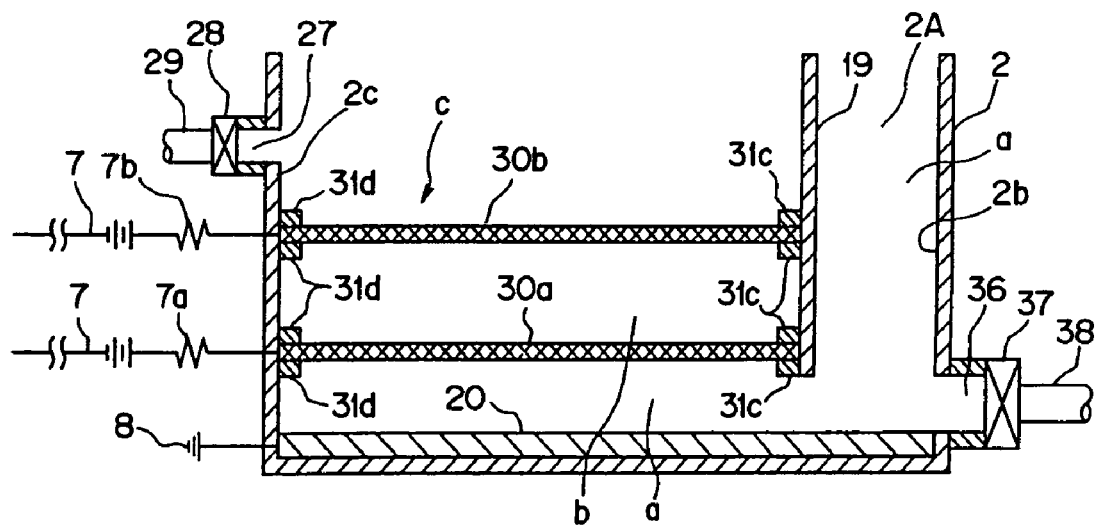
Figure 8:
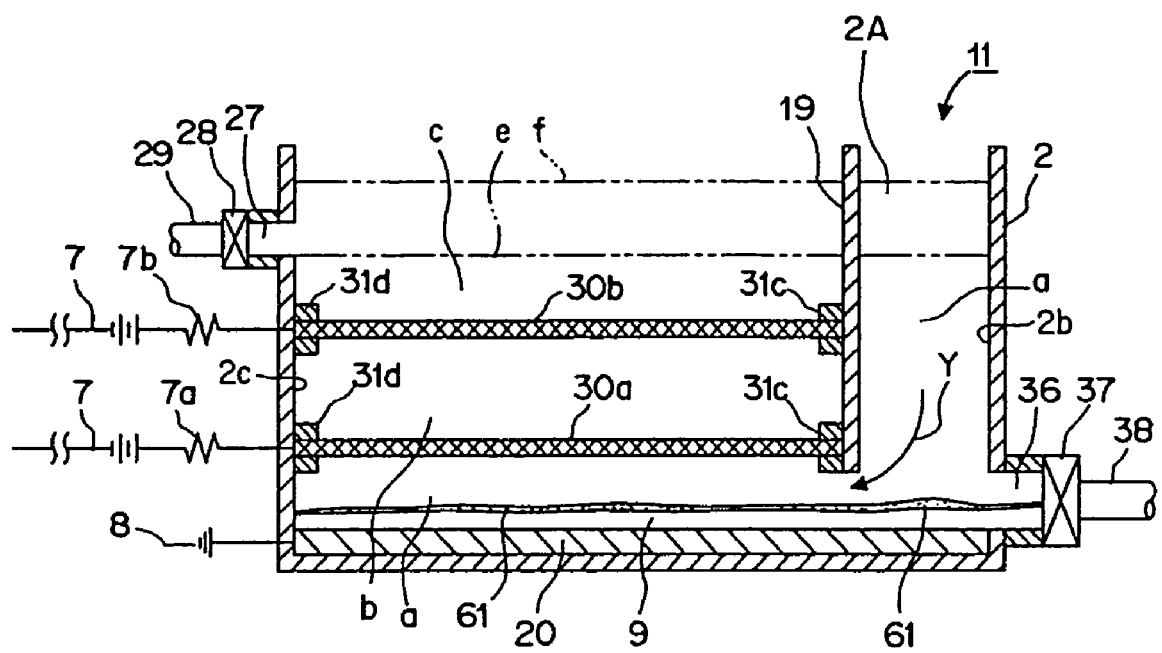
FIG. 8 is a schematic sectional view illustrating operation of the waste liquid regeneration apparatus for a printer as the second embodiment of the present invention.
Figure 9:
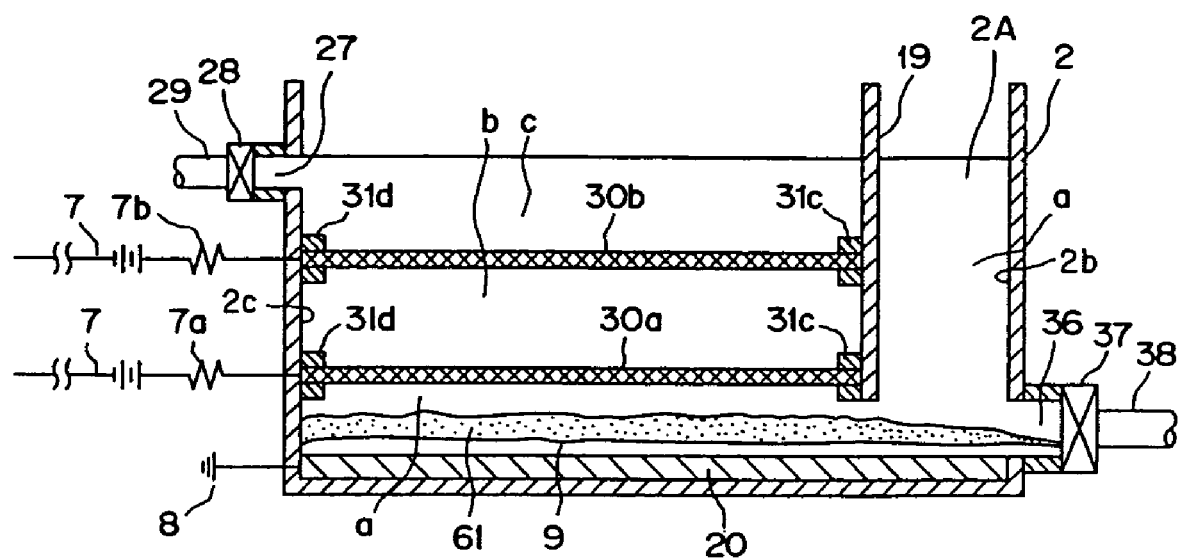
FIG. 9 is a schematic sectional view illustrating operation of the waste liquid regeneration apparatus for a printer as the second embodiment of the present invention.

First, a second embodiment of the present invention is described. FIGS. 7(a), 7(b), 8 and 9 are views showing a waste liquid regeneration apparatus and a waste liquid regeneration method for a printer as the second embodiment of the present invention, and wherein FIG. 7(a) is a schematic plan view of a waste liquid reserving vessel of the waste liquid regeneration apparatus; FIG. 7(b) is a schematic sectional view as viewed in a sideward direction of the waste liquid reserving vessel; and FIGS. 8 and 9 are schematic sectional views illustrating operation of the waste liquid regeneration apparatus. In the figures, like reference characters to those in the figures referred to in the preceding description denote like elements, and description of them is partly omitted.

In the waste liquid regeneration apparatus of the first embodiment, the grounding electrode plate (grounding electrode) 20 and the application electrode plates 30 are provided such that they extend uprightly in a vertical direction in the waste liquid reserving vessel 2. In contrast, in the waste liquid regeneration apparatus for a printer according to the present embodiment, however, the grounding electrode plate (grounding electrode) 20 and the application electrode plates 30 each in the form of a plate are disposed horizontally in the waste liquid reserving vessel 2 as seen in FIG. 7(a) and FIG. 7(b). Further, similarly as in the first embodiment, two application electrode plates 30 are provided. The grounding electrode plate 20 is connected to the ground 8, and the electrode plates 30a and 30b are connected to the high-voltage power supply 7 through voltage loads (7a, 7b) different from each other so that different voltages may be applied thereto, similarly as in the first embodiment.

Further, the grounding electrode plate 20 is disposed substantially horizontally at a lower portion in the waste liquid reserving vessel 2, and the electrode plates 30a and 30b are disposed substantially horizontally above the grounding electrode plate 20 in the vessel 2. In the present embodiment, however, a partition wall 19 is disposed in the proximity of the side wall 2b in the vessel 2, and a region partitioned by the partition wall 19 and the side wall 2b is formed as a waste liquid loading portion 2A into which the waste liquid 11 is to be loaded. The electrode plates 30a and 30b are disposed between the partition wall 19 and the other wall 2c, which opposes to the side wall 2b in the vessel 2, with insulating members 31c and 31d interposed therebetween, respectively. It is to be noted that the grounding electrode plate 20 is provided such that it covers the overall area of the bottom in the vessel 2.

Accordingly, the inside of the vessel 2 is partitioned into three regions of a first region (referred to also as a first layer or a loading layer) a, a second region (referred to also as a second layer or a processing layer) b and a third region (referred to also as a third layer or a processed layer) c in order upwardly from below by the electrode plates 30a and 30b. However, since the electrode plates 30a and 30b are each formed from a wire mesh type metal electrode plate similarly as in the first embodiment, the waste liquid 11 can circulate between the regions a, b and c. Further, the waste liquid loading portion 2A on the side wall 2b side in the vessel 2 forms part of the first region (first layer) a.

In the third region (third layer) c at an upper portion in the vessel 2, a first recovering hole 27 for recovering regenerated cleaning liquid 62 therethrough is provided, and a second recovering hole 36 for recovering ink pigment 61 and water 9 separated from the cleaning liquid 62 therethrough is provided in the first region (first layer) a at a lower portion in the vessel 2. The recovering holes 27 and 36 are formed similarly as in the first embodiment.

The waste liquid regeneration apparatus for a printer as the second embodiment of the present invention is configured in such a manner as described above. Thus, cleaning waste liquid 11 is loaded into the vessel 2 through the waste liquid loading portion 2A until the waste liquid 11 is filled up to a level indicated by an alternate long and two short dashes line e as seen in FIG. 8 in advance, and the waste liquid 11 is further supplied into the vessel 2 through the waste liquid loading portion 2A. The waste liquid supplied enters the second region (processing layer) b along the direction indicated by an arrow mark Y.

Here, the waste liquid 11 is separated into water 9, ink pigment 61 and cleaning liquid 62 as voltages are applied between the electrode plates 30a and 30b. The cleaning liquid 62 separated and regenerated cleanly is reserved into the third region (processed layer) c at an upper portion of the vessel 2. At this time, since the waste liquid loading portion 2A is provided in a communicating relationship with the first region (loading layer) a, the separation of the cleaning liquid 62, water 9 and ink pigment 61 from the waste liquid 11 can be performed further smoothly.

Meanwhile, the separated water 9 settles to a lower portion of the vessel 2 and is reserved into the first region a immediately above the grounding electrode plate 20. Here, the water 9 itself serves as the ground and causes the ink pigment 61 to agglomerate in the proximity of and adhere to the interface of the water 9, and as a result, the separated ink pigment 61 adheres to the surface of the water 9 and is reserved by the water 9.

The cleaning liquid 62 in the vessel 2 increases by an amount equal to that of the supplied waste liquid 11, and the level of the cleaning liquid 62 rises to a position indicated by an alternate long and two short dashes line f in FIG. 8. As a result, the cleaning liquid regenerated cleanly can be recovered from the recovering hole 27 through the valve 28 and the pipe 29.

If the recovery of the cleaning liquid 62 through the separation of the waste liquid 11 into the water 9, ink pigment 61 and cleaning liquid 62 is continued until a long period of time passes, then a large amount of water 9 is reserved above the grounding electrode plate 20 as seen in FIG. 9. Further, a large amount of separated ink pigment 61 adheres to the surface of the water 9.

After the ink pigment 61 and the water 9 are reserved after the use for a long period of time in this manner, it is necessary to dispose of them from the vessel 2. In the present embodiment, the water 9 and the ink pigment 61 are recovered simultaneously from the recovering hole 36 to the outside of the vessel 2 through the valve 37 and the pipe 38 so that they are disposed of.

Since the ink pigment 61 separated from the waste liquid 11 and reserved can be disposed of readily together with the water 9 in this manner, an apparatus relating to the disposal is eliminated and besides they can be disposed of in short time. Consequently, also the operation cost can be reduced.

Further, in the waste liquid disposal according to the present method, the separated ink pigment 61 and water 9 do not dissolve into the cleaning liquid 62 even if they are left for a long period of time (for more than one year) Therefore, the caution time relating to the disposal of the ink pigment 61 is required little.

Figure 10:
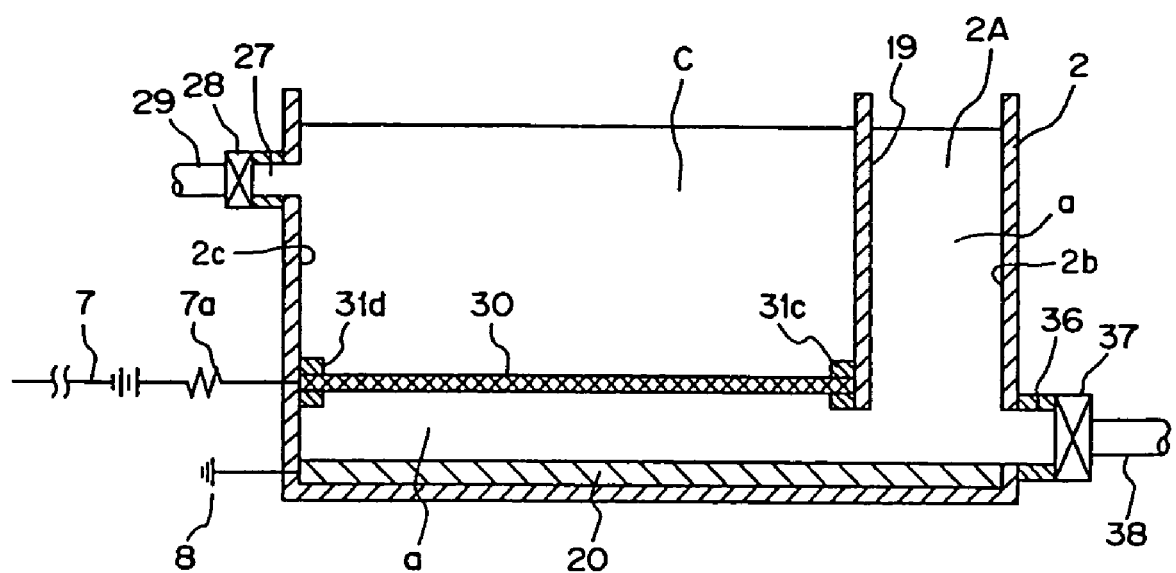
FIG. 10 is a view showing a waste liquid regeneration apparatus for a printer as a third embodiment of the present invention and is a schematic sectional view as viewed in a sideward direction of a waste liquid reserving vessel.

Now, a third embodiment of the present invention is described. FIG. 10 is a schematic sectional view showing a waste liquid regeneration apparatus for a printer as a third embodiment of the present invention. In FIG. 10, like reference characters to those in the figures referred to in the preceding description denote like elements, and description of them is partly omitted.

As shown in FIG. 10, in the present embodiment, the second embodiment is modified such that it inudes only one (set of) application electrode plate 30a, and the other part of the present embodiment is configured similarly to that of the second embodiment.

Since the waste liquid regeneration apparatus for a printer as the third embodiment of the present embodiment is configured in such a manner as described above. Therefore, when compared with an alternative case wherein two (sets of) electrode plates 30a and 30b are used as in the second embodiment, although the effect as an electrostatic filter dro a little and the action for separating the waste liquid 11 into the water 9, ink pigment 61 an cleaning liquid 62 becomes weak, a considerable separation effect is still achieved. Particularly, depending upon the type of cleaning waste liquid (the types of the cleaning liquid and the ink pigment), sufficient separation can be performed in a short period of time.

Accordingly, depending upon the conditions of cleaning waste liquid and the operation conditions (required regeneration cye), even only one application electrode is used to simplify the configuration as in the present embodiment, waste liquid can be regenerated sufficiently.

It is to be noted that, similarly to this, also a configuration wherein only one (set of) application electrode plate is used in a configuration wherein the electrode plates are disposed uprightly in a vertical direction as in the first embodiment may be available.

Figure 11:
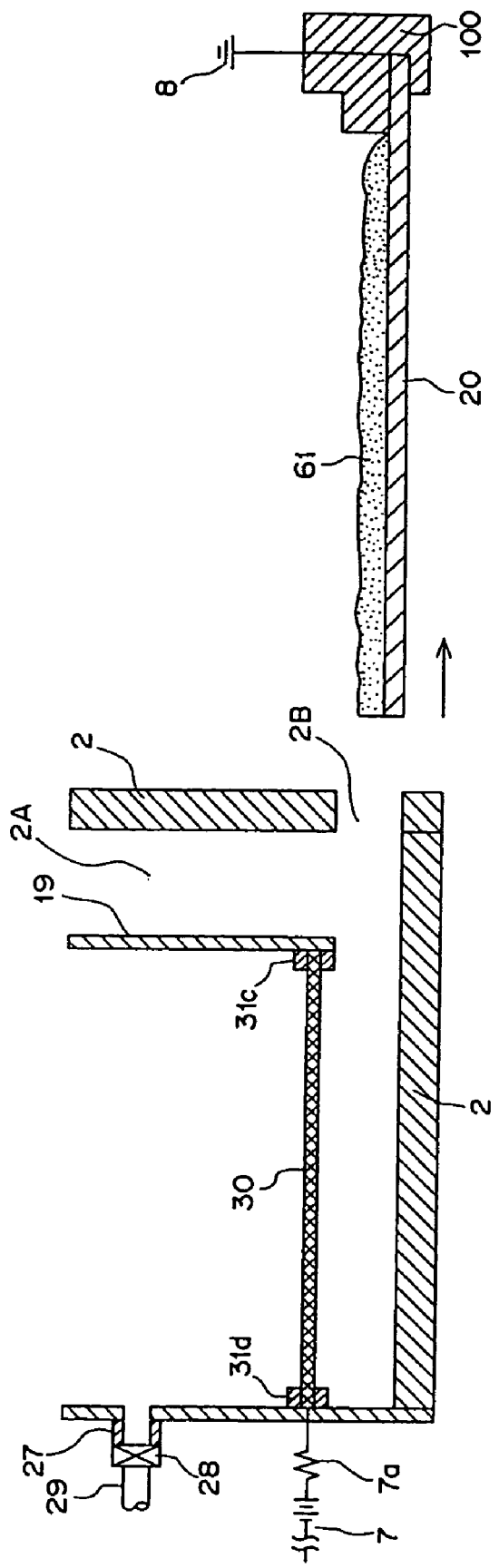
FIG. 11 is a view showing a waste liquid regeneration apparatus for a printer as a fourth embodiment of the present invention and is a schematic sectional view as viewed in a sideward direction of a waste liquid reserving vessel in a state wherein a grounding electrode of the waste liquid regeneration apparatus is drawn out to the outside.
Figure 12:
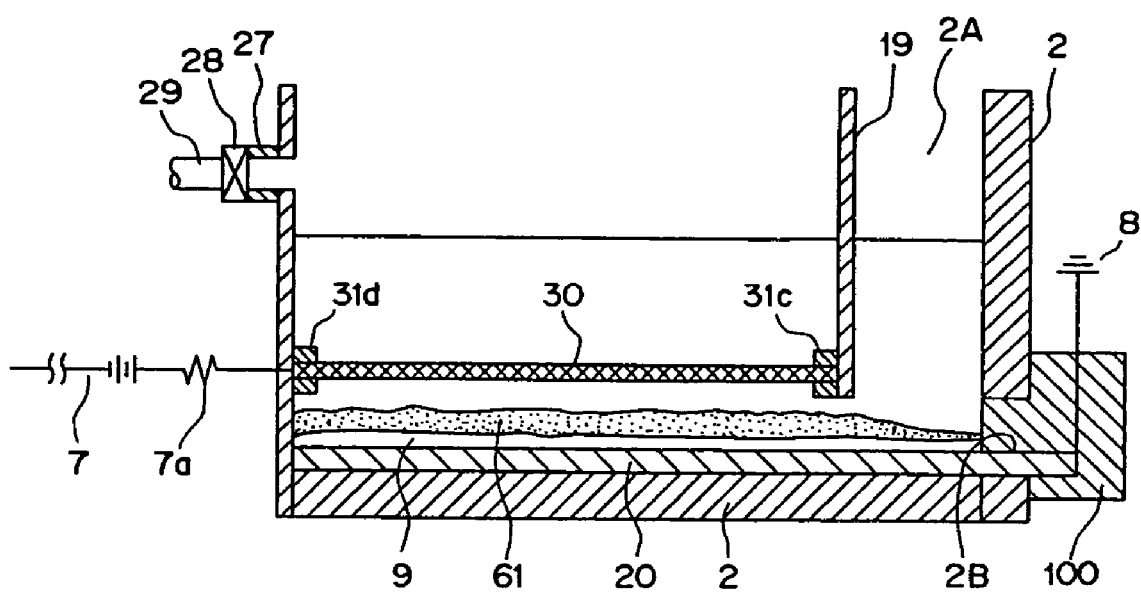
FIG. 12 is a view showing the waste liquid regeneration apparatus for a printer as the fourth embodiment of the present invention and is a schematic sectional view as viewed in a sideward direction of the waste liquid reserving vessel.
Figure 13:
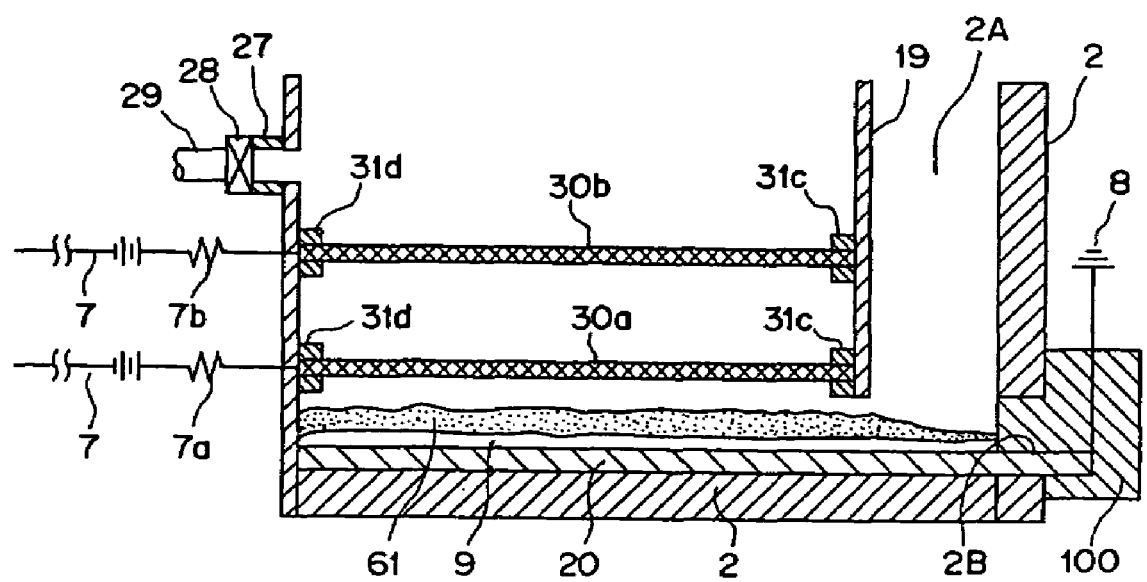
FIG. 13 is a view showing a modification to the waste liquid regeneration apparatus for a printer as the fourth embodiment of the present invention and is a schematic sectional view as viewed in a sideward direction of the waste liquid reserving vessel.

Subsequently, a fourth embodiment of the present invention is described. FIGS. 11 to 13 are views showing a waste liquid regeneration apparatus and a waste liquid regeneration method for a printer as the fourth embodiment of the present invention, and wherein FIGS. 11 and 12 are schematic sectional views showing the waste liquid regeneration apparatus and FIG. 13 is a schematic sectional view showing a modification to the waste liquid regeneration apparatus. In the figures, like reference characters to those in the figures referred to in the preceding description denote like elements, and description of them is partly omitted.

In the waste liquid regeneration apparatus of the present embodiment, that of the second embodiment is modified such that the grounding electrode 20 disposed at a lower portion of the vessel 2 can be drawn out to the outside of the vessel 2. In particular, an opening 2B is provided at a lower portion of the vessel 2 as seen in FIGS. 11 and 12, and a conductive adapter (grounding electrode fixing adapter) 100 which can be removably inserted into the opening 2B from the outside of the vessel 2 is provided. The grounding electrode 20 is securely mounted at an end thereof to the conductive adapter 100.

Thus, if the grounding electrode 20 is advanced into the vessel 2 through the opening 2B to mount the conductive adapter 100 into the opening 2B, then the present apparatus is placed into a used state as seen in FIG. 12. However, if the conductive adapter 100 is removed from the opening 2B, then the grounding electrode 20 can be drawn out to the outside of the vessel 2 as seen in FIG. 11.

It is to be noted that, if the conductive adapter 100 is mounted into the opening 2B, then the opening 2B is sealed with the conductive adapter 100 so that liquid may not leak from within the vessel 2. Further the grounding electrode 20 is connected to the ground 8 through the conductive adapter 100.

The waste liquid regeneration apparatus for a printer as the fourth embodiment of the present embodiment is configured in such a manner as described above. Therefore, when the ink pigment 61 is to be disposed of, the grounding electrode 20 can be drawn out to the outside of the vessel 2 as seen in FIG. 11 to dispose of the ink pigment 61 deposited on the grounding electrode 20.

In this manner, where the grounding electrode 20 is disposed horizontally, if liquid in vessel 2 is removed, then since the ink pigment 61 is deposited on the grounding electrode 20, the ink pigment 61 can be disposed of readily if the grounding electrode 20 is drawn out to the outside of the vessel 2.

Accordingly, if the water 9 and the ink pigment 61 are reserved on the grounding electrode 20 through use of the apparatus for a long period of time, then the cleaning liquid 62 in the vessel 2 is recovered as much as possible from the recovering hole 27, and thereafter, the grounding electrode fixing adapter 100 is slidably moved to draw out the grounding electrode 20 to the outside of the vessel 2 as seen in FIG.

12. Thereupon, the water 9 and the ink pigment 61 as well as some amount of the cleaning liquid reserved on the grounding electrode 20 are disposed of to the outside of the vessel.

It is to be noted that the sliding movement (removal) of the grounding electrode fixing adapter 100 may be performed after the liquid in the vessel 2 is discharged to the outside in advance. Or, cleaning and so forth of the grounding electrode 20 may be performed at a position outside the vessel 2 after it is extracted to the position.

According to the method described, it is easy to dispose of the separated ink pigment 61 to the outside of the vessel 2, and also the apparatus can be formed in a comparatively simplified configuration. Further, since the grounding electrode plate 20 is drawn out to the outside of the vessel 2, there is an advantage also in that cleaning of the inside of the vessel 2 can be performed readily.

Incidentally, such a method of drawing out the grounding electrode 20 to the outside of the vessel 2 to dispose of the ink pigment 61 as described above can be applied not only to a configuration where only one (set of) application electrode plate 30 is used (third embodiment) as shown in FIGS. 11 and 12 but also to another configuration wherein a plurality of (for example, two) application electrode plates 30 are used (second embodiment) as shown in FIG. 13.

Further, a configuration wherein the grounding electrode 20 is disposed in a vertical direction as in the first embodiment may be modified such that the grounding electrode 20 can be drawn out upwardly such that it is removed to remove the ink pigment 61 adhering to the grounding electrode 20. In this manner, selection of the number of combination of application electrode plates and the installation method of the grounding electrode can be performed freely.

Figure 14:
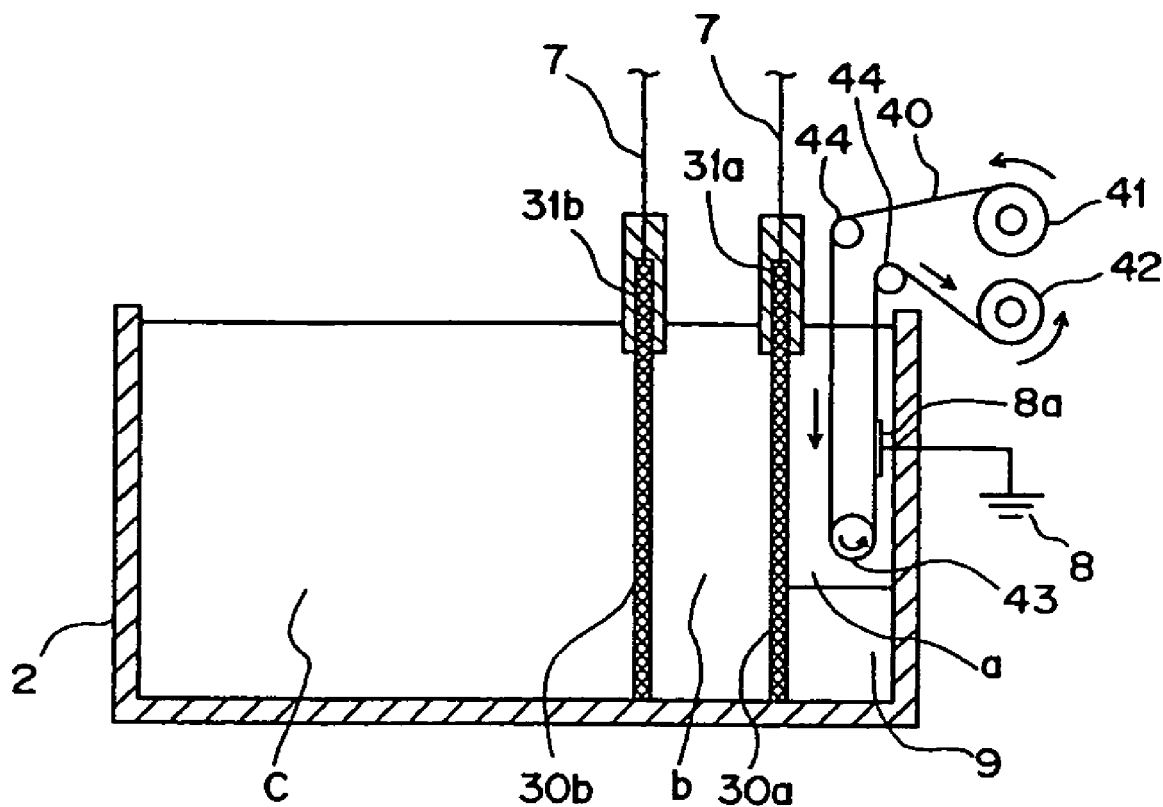
FIG. 14 is a view showing a waste liquid regeneration apparatus for a printer as a fifth embodiment of the present invention and is a schematic sectional view as viewed in a sideward direction of a waste liquid reserving vessel.

Now, a fifth embodiment of the present invention is described. FIG. 14 is a schematic sectional view showing a waste liquid regeneration apparatus and a waste liquid regeneration method for a printer as a fifth embodiment of the present invention. In FIG. 14, like reference characters to those in the figures referred to in the preceding description denote like elements, and description of them is partly omitted.

As shown in FIG. 14, according to the present embodiment, the first embodiment is modified such that aluminum foil 40 is used as the grounding electrode such that the ink pigment 61 may adhere to the opposite surfaces of the aluminum foil 40. In the present apparatus, new aluminum foil 40 is prepared in a coiled form on a delivering apparatus 41 outside the vessel 2, and the aluminum foil 40 is transported as seen in FIG. 14 under the guidance of a guide roller 43 in the vessel 2 and guide rollers 44 outside the vessel 2 such that it is taken up by a take-up apparatus 42 outside the vessel 2. The grounding electrode 8 is connected to the aluminum foil 40 through a sliding contract terminal 8a.

It is to be noted that the delivering apparatus 41 inudes a reel on which the coiled aluminum foil 40 is wound while the take-up apparatus 42 inudes another reel around which the aluminum foil 40 can be wound. If the reel on the take-up apparatus 42 side is rotated by a reel motor or by manual operation, then the reel on the delivering apparatus 41 side is rotated accordingly to feed out the aluminum foil 40.

The waste liquid regeneration apparatus for a printer as the fifth embodiment of the present invention is configured in such a manner as described above. Consequently, the aluminum foil 40 is charged by the grounding electrode 8 and immersed in the waste liquid 11 in the vessel 2, and the ink pigment 61 in the waste liquid 11 in the vessel 2 adheres to the surfaces (the opposite front and rear surfaces) of the aluminum foil 40. The new aluminum foil 40 enters the waste liquid 11 in the vessel 2, and after the ink pigment 61 adheres to the aluminum foil 40, the aluminum foil 40 is taken up by the other take-up apparatus 42. The movement of the aluminum foil 40 in this instance may be performed in such a method that the aluminum foil 40 is normally moved at a very low speed or is moved in a predetermined cye after it sto for a fixed period of time.

Since the ink pigment 61 separated from the cleaning liquid 62 adheres to and is recovered through the aluminum foil 40 in this manner, the ink pigment 61 does not adhere to or is not deposited in the inside of the vessel 2, and contamination of the inside of the vessel 2 can be prevented. Further, since the recovered ink pigment 61 can be disposed of together with the aluminum foil 40, also contamination of the apparatus and the environment can be prevented.

Besides, the removing apparatus configuration of the type described is compact and requires a comparatively low cost. Further, since the aluminum foil 40 may be, for example, aluminum foil or the like on the market, there is an advantage that also the running cost is comparatively low.

It is to be noted that the delivering apparatus 41 and the take-up apparatus 42 may be operated in an interlocking relationship so that excessive tensile force may not be applied to the aluminum foil 40 or the reel of the delivering apparatus 41 may be driven by a motor or the like similarly to the take-up apparatus 42. Naturally, some other conductive thin metal film (metal sheet) may be used in place of the aluminum foil 40.

Figure 15:
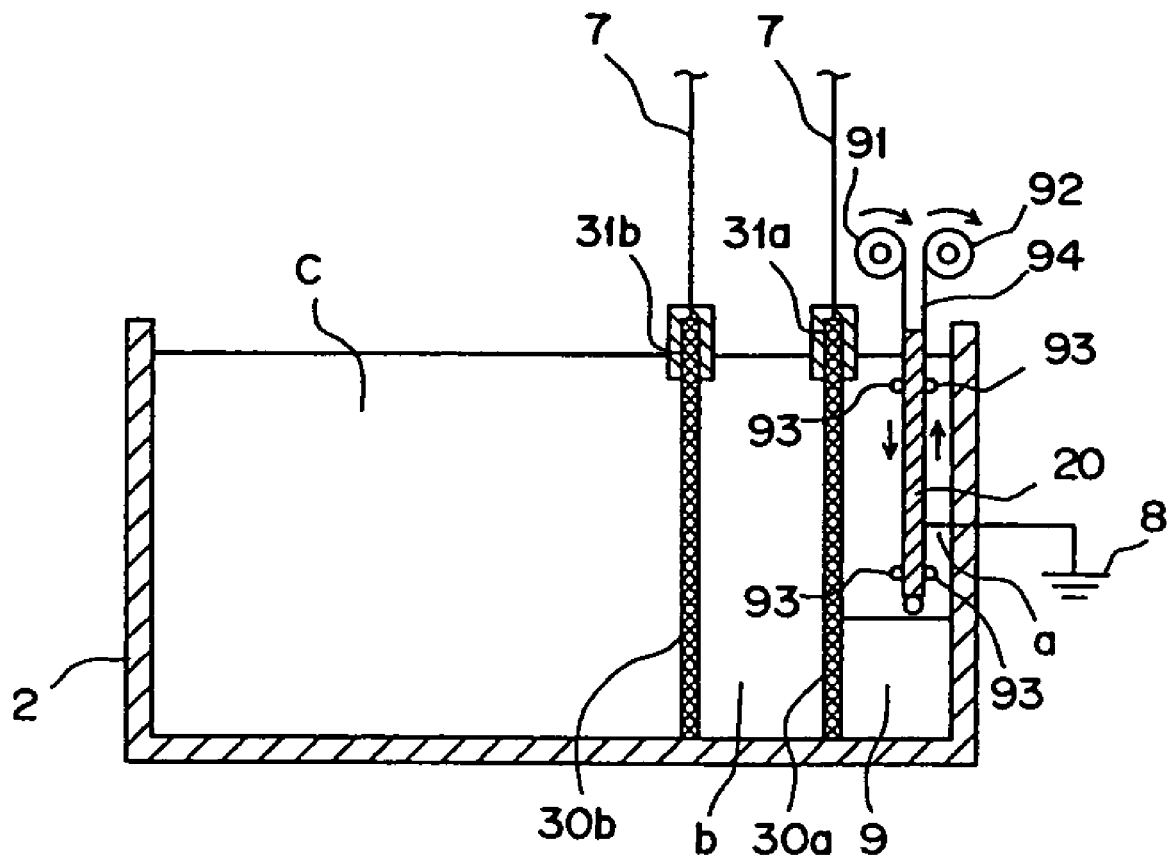
FIG. 15 is a view showing a waste liquid regeneration apparatus for a printer as a sixth embodiment of the present invention and is a schematic sectional view as viewed in a sideward direction of a waste liquid reserving vessel.

Now, a sixth embodiment of the present invention is described. FIG. 15 is a schematic sectional view showing a waste liquid regeneration apparatus and a waste liquid regeneration method for a printer as a sixth embodiment of the present invention. In FIG. 15, like reference characters to those in the figures referred to in the preceding description denote like elements, and description of them is partly omitted.

As seen in FIG. 15, the present embodiment is configured such that ink pigment 61 adheres to the surface of thin paper 94 and is removed together with the thin paper 94. In particular, in the present system, the grounding electrode 20 is set in the vessel 2, and the thin paper 94 is pressed against the opposite surfaces of the grounding electrode plate 20 through a plurality of guide rollers 93. Further, the thin paper 94 is prepared as new thin paper 94 in a coiled form (rolled form) on a delivering apparatus 91 outside the vessel 2 and is transported under the guidance of the guide rollers 93 in the vessel 2 until it is taken up by a take-up apparatus 92 outside the vessel 2 as seen in FIG. 15. Since the thin paper 94 delivered from the delivering apparatus 91 is kept pressed against the grounding electrode plate 20 in the liquid in the vessel 2, it is charged by the grounding electrode plate 20.

The waste liquid regeneration apparatus for a printer as the sixth embodiment of the present invention is configured in such a manner as described above. Therefore, the ink pigment 61 adheres to the surface of the thin paper 94 in the liquid in the vessel 2. If the thin paper 94 to which the ink pigment 61 adheres is taken up by the other take-up apparatus 92, then the unnecessary ink pigment 61 can be recovered readily together with the thin paper 94. Then, the thin paper 94 taken up by the take-up apparatus 92 and having the ink pigment 61 adhering thereto can be disposed of as it is. Here, the thin paper 94 in the liquid layer in the vessel 2 may be normally moved at a very low speed or may be repetitively moved and stopped in a predetermined cye.

Where the ink pigment removing apparatus uses the thin paper 94 in a coiled form in this manner, adhesion of the ink pigment 61 to the inside of the vessel 2 and contamination of the regenerated cleaning liquid can be prevented readily. Further, since the adhering ink pigment is disposed of together with the thin paper 94, also a contamination preventing effect for the apparatus and the environment can be anticipated. Furthermore, the removing apparatus can be configured readily and also the production cost can be reduced. Besides, since thin paper is used, there is an advantage in that also the running cost can be reduced.

It is to be noted that the delivering apparatus 41 and the take-up apparatus 42 may be operated in an interlocking relationship so that excessive tensile force may not be applied to the thin paper 94 similarly as in the fifth embodiment or the reel of the delivering apparatus 41 may be driven by a motor or the like similarly to the take-up apparatus 42.

Figure 16A:
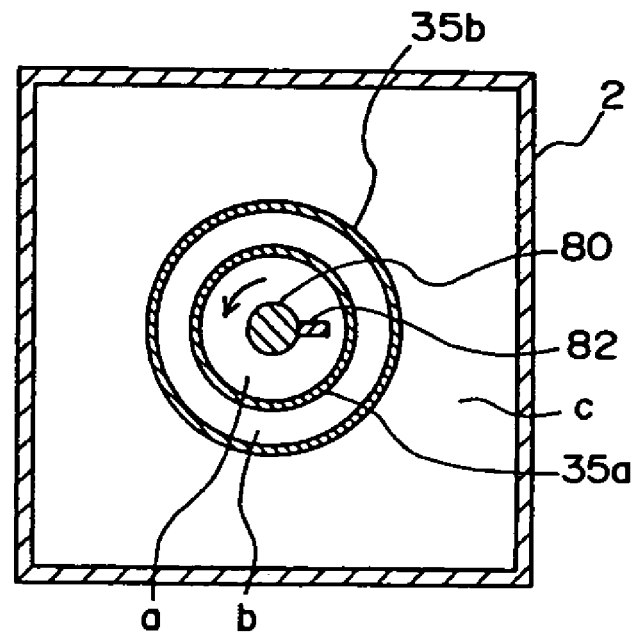
FIG. 16($a$) is a horizontal sectional view [sectional view taken along line C-C of FIG. 16($b$)] of a waste liquid regeneration apparatus for a printer as a seventh embodiment of the present invention.
Figure 16B:
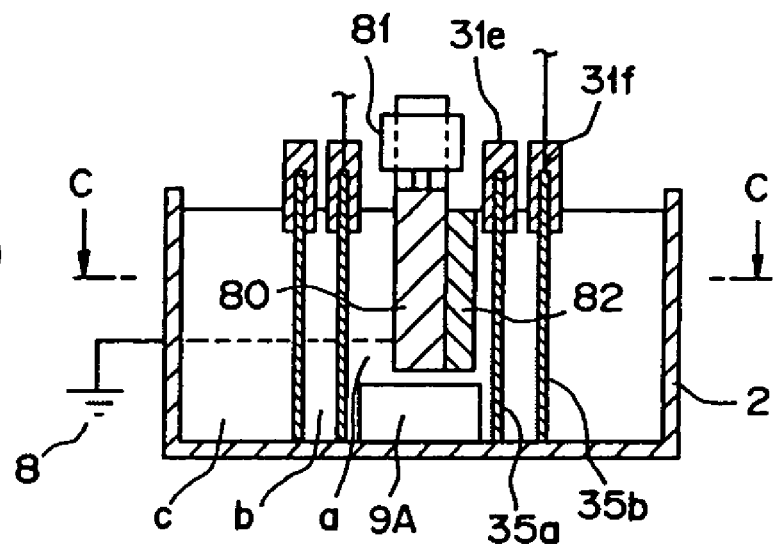

Now, a seventh embodiment of the present invention is described. FIGS. 16(a) and 16(b) are views showing a waste liquid regeneration apparatus and a waste liquid regeneration method for a printer as a seventh embodiment of the present invention, and wherein FIG. 16(a) is a horizontal sectional view [sectional view taken along line C-C of FIG. 16(b)] of the waste liquid regeneration apparatus and FIG. 16(b) is a schematic sectional view as viewed in a sideward direction of a waste liquid reserving vessel. In the figures, like reference characters to those in the figures referred to in the preceding description denote like elements, and description of them is partly omitted.

As seen in FIGS. 16(a) and 16(b), in the present embodiment, the vessel 2 is formed in a quadrangular shape (square shape) as viewed in plan, and a cylindrical grounding electrode 80 is disposed at a central portion of the vessel 2. An application electrode plate 35 is formed in a cylindrical shape and disposed around the cylindrical grounding electrode 80. Here, the application electrode plate 35 is formed in two layers inuding an inner layer and an outer layer, and a metal mesh 35a in the form of a cylindrical metal gauze is disposed for the first layer while a similar metal mesh electrode 35b is disposed also for the second layer.

For example, a voltage of 10 kV (kilovolt) is applied to the electrode 35a for the first layer nearer to the cylindrical grounding electrode 80 while another voltage of 12 kV (kilovolt) higher than that to the first layer is applied to the second layer. The voltage values mentioned are given as standard voltage values, and different voltage values may be used instead.

The cylindrical electrode 80 is driven to rotate by a motor 81. Further, a scraping blade 82 is pressed against the cylindrical electrode 80 such that, when the cylindrical electrode 80 rotates, the scraping blade 82 pressed against and slidably contacting with the outer periphery of the cylindrical electrode 80 scrapes off ink pigment 61 adhering to the surface of the cylindrical electrode 80.

The waste liquid regeneration apparatus for a printer as the seventh embodiment of the present invention is configured in such a manner as described above. Thus, waste liquid (contaminated cleaning liquid) is supplied into the loading layer a at the central location. Here, if voltages are applied to the application electrode plates 35a and 35b, then ink pigment adheres to the cylindrical electrode 80 connected to the ground 8.

Here, the ink pigment 61 adhering to the cylindrical electrode 80 is scraped off by the scraping blade 82, and the scraped off ink pigment 61 is reserved into a lower portion of the vessel 2. The ink pigment 61 stored at the lower portion of the vessel 2 can be periodically taken out to the outside of the vessel 2. However, under certain circumstances, the ink pigment 61 may be dropped into a water storage tank portion 9A of the separated water 9 and disposed of together with the water.

The present apparatus having the configuration described above is advantageous in that, since the grounding electrode 80 has a cylindrical shape, ink pigment is liable to adhere to the grounding electrode 80 and also in that the apparatus configuration is easy and also the production cost and the running cost can be suppressed low.

Now, an eighth embodiment of the present invention is described. FIGS. 17(a) and 17(b) are views showing a waste liquid regeneration apparatus and a waste liquid regeneration method for a printer as an eighth embodiment of the present invention, and wherein FIG. 17(a) is a schematic sectional view as viewed in a sideward direction of a waste liquid reserving vessel and FIG. 17(b) is a sectional view taken along line D-D of FIG. 17(a). In the figures, like reference characters to those in the figures referred to in the preceding description denote like elements, and description of them is partly omitted.

As shown in FIGS. 17(a) and 17(b), in the present embodiment, the first embodiment is modified such that a grounding electrode plate of the rotary disk type is used as the grounding electrode plate. In particular, a grounding electrode plate 83 in the form of a disk is supported for rotation on a rotary shaft 85 of a motor 86 in the waste liquid loading layer a in the vessel 2. An insulating member 84 is applied to one face of the grounding electrode plate 83 so that the ink pigment 61 may adhere only to the other face of the grounding electrode plate 83.

A scraping blade 87 for scraping off the adhering ink pigment 61 is provided adjacent the ink pigment adhering face of the grounding electrode plate 83 and pressed against the adhering face. Consequently, when the grounding electrode plate 83 rotates, the ink pigment 61 adhering to the grounding electrode plate 83 is scraped off from the grounding electrode plate 83 by the blade 87.

The waste liquid regeneration apparatus for a printer as the eighth embodiment of the present invention is configured in such a manner as described above. Consequently, when the electrode plate 83 rotates, the ink pigment 61 adhering to the grounding electrode plate 83 is scraped off from the electrode plate 83 by the blade 87, and the scraped off ink pigment 61 is reserved at a lower portion of the vessel 2. Therefore, the ink pigment 61 may be discharged periodically.

Consequently, while the configuration of the apparatus is simplified and also the production cost of the apparatus can be reduced, removal of adhering ink pigment can be performed readily and with certainty, and also there is an advantage that the availability factor can be raised.

Figure 18A:
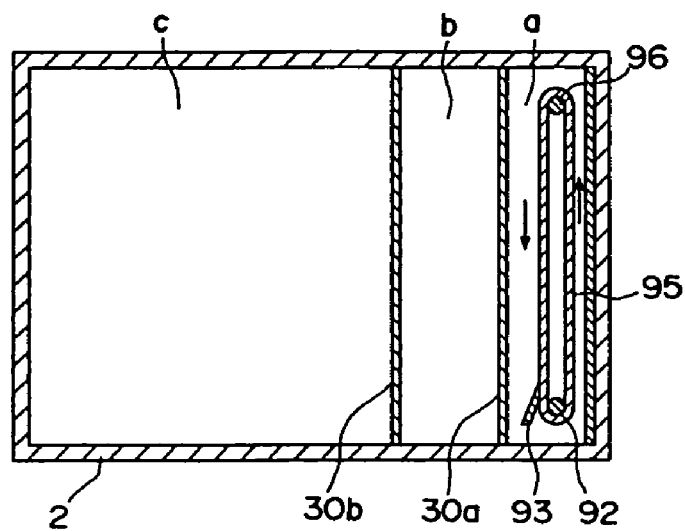
FIG. 18($a$) is a horizontal sectional view [sectional view taken along line C-C of FIG. 18($b$)] showing a waste liquid regeneration apparatus for a printer as a ninth embodiment of the present invention.
Figure 18B:
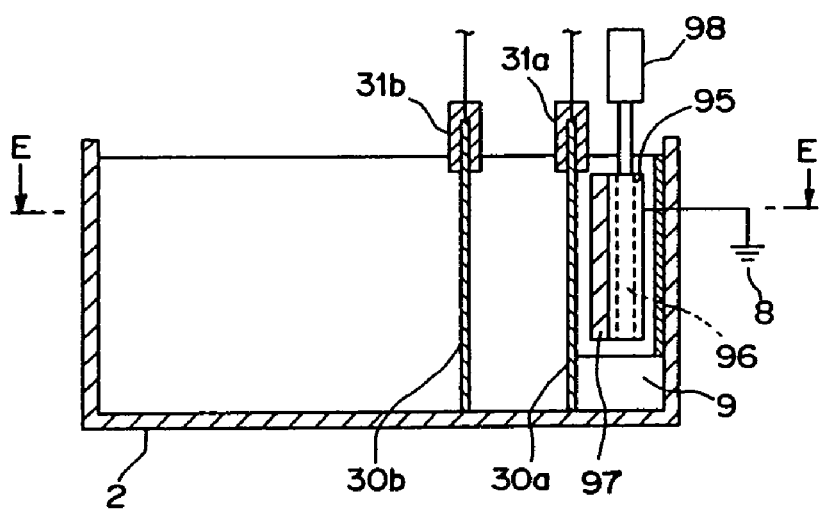

Now, a ninth embodiment of the present invention is described. FIGS. 18(a) and 18(b) are views showing a waste liquid regeneration apparatus and a waste liquid regeneration method for a printer as a ninth embodiment of the present invention, and wherein FIG. 18(a) is a horizontal sectional view [sectional view taken along line E-E of FIG. 18(b)] of the waste liquid regeneration apparatus and FIG. 18(b) is a schematic sectional view as viewed in a sideward direction of a waste liquid reserving vessel. In the figures, like reference characters to those in the figures referred to in the preceding description denote like elements, and description of them is partly omitted.

As shown in FIGS. 18(a) and 18(b), the apparatus of the present embodiment adopts a metal sheet 95 as the grounding electrode and the metal sheet 95 is disposed in an endless fashion. In particular, the metal sheet 95 having an endless configuration is held by a pair of rotary rolls 96, 96 in the first region (the loading layer) a in the vessel. One of the rotary rolls 96 is driven to rotate by a motor 98, and the endless metal sheet 95 is driven by the rotary roll 96.

The metal sheet 95 is used as the grounding electrode so that ink pigment 61 may adhere to the surface of the metal sheet 95. A scraping blade 97 is pressed against the surface of the metal sheet 95 such that the ink pigment 61 adhering to the surface of the metal sheet 95 is scraped off by the scraping blade 97.

The waste liquid regeneration apparatus for a printer as the ninth embodiment of the present invention is configured in such a manner as described above. Thus, if the ink pigment 61 adheres to the surface of the metal sheet 95 serving as the grounding electrode, then the scraping blade 97 pressed against the surface of the metal sheet 95 scrapes off the ink pigment 61 adhering to the surface of the metal sheet 95. The ink pigment scraped off in this manner is reserved at a lower portion in the vessel 2, and the reserved ink pigment may be periodically disposed of to the outside.

In this manner, according to the present embodiment, since the configuration is simple, the burden of the production cost is light. Further, since the maintenance is easy, there is an advantage also that the running cost is suppressed.

Figure 19:
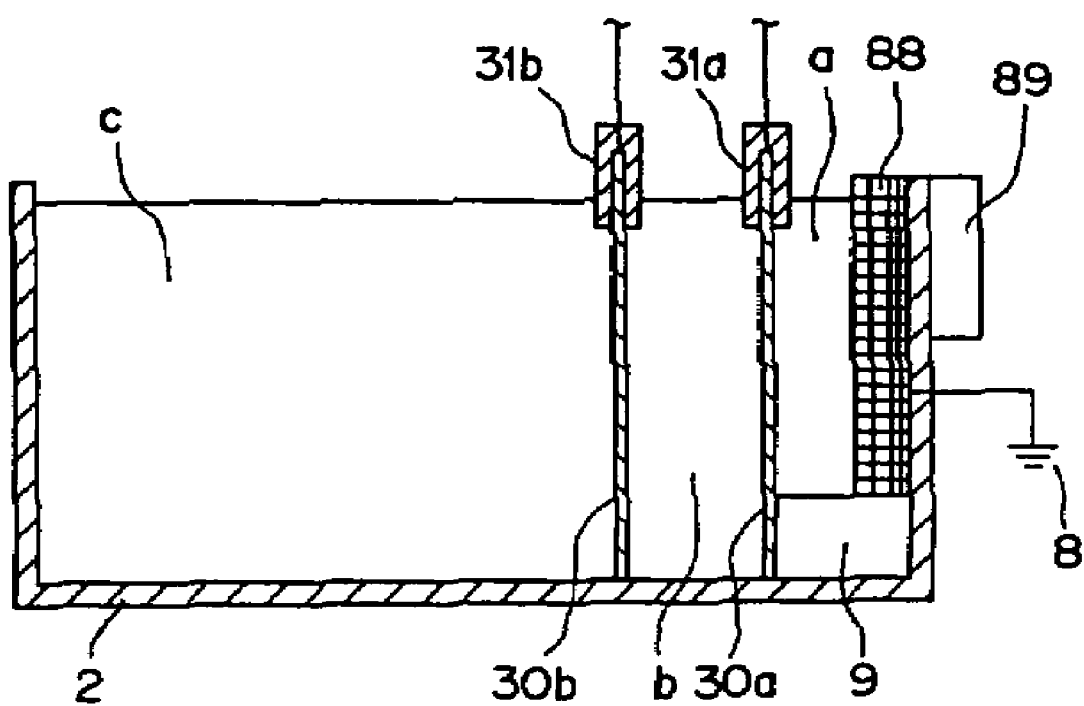
FIG. 19 is a view showing a waste liquid regeneration apparatus for a printer as a tenth embodiment of the present invention and is a schematic sectional view as viewed in a sideward direction of a waste liquid reserving vessel.

Now, a tenth embodiment of the present invention is described. FIG. 19 is a schematic sectional view showing a waste liquid regeneration apparatus and a waste liquid regeneration method for a printer as a tenth embodiment of the present invention. In FIG. 19, like reference characters to those in the figures referred to in the preceding description denote like elements, and description of them is partly omitted.

In the present embodiment, the electrodes are configured such that a counter electric field may not be produced readily. In particular, as seen in FIG. 19, the apparatus of the present embodiment is characterized in that it uses a conductive metal member in the form of a projection or a mesh shaped so that + charges of adhering ink pigment may flow readily to minimize the influence of a counter electric field. Further, an ultrasonic oscillation generation apparatus 89 is additionally provided for applying ultrasonic vibration to a grounding electrode 88 to re-dissolve the ink pigment 61 adhering once to the grounding electrode 88 into cleaning liquid 62 in the liquid layer in the vessel 2.

The waste liquid regeneration apparatus for a printer as the tenth embodiment of the present invention is configured in such a manner as described above. Therefore, the grounding electrode 88 is less likely to be influenced by a counter electric field. Further, since there is no possibility that the ink pigment 61 adhering once to the grounding electrode 88 may be dissolved into the liquid layer in the vessel 2, maintenance-free use of the waste liquid regeneration apparatus for a long period of time (according to an experiment) can be anticipated.

After continuous use for a long period of time (according to the experiment, ink pigment adhered to the thickness of 5 mm in one month), the grounding electrode 88 is subject to ultrasonic oscillation by the ultrasonic oscillation generation apparatus 89 to re-dissolve the adhering ink pigment 61 into the cleaning liquid 62 in the liquid layer of the vessel 2. Thereafter, the ink pigment 61 is disposed of together with the cleaning liquid 62.

According to such a removing technique as described above, there is an advantage that the maintenance for a long period of time is eliminated and the efficiency in disposal operation is improved. Therefore, the running cost can be suppressed low.

Figure 20:
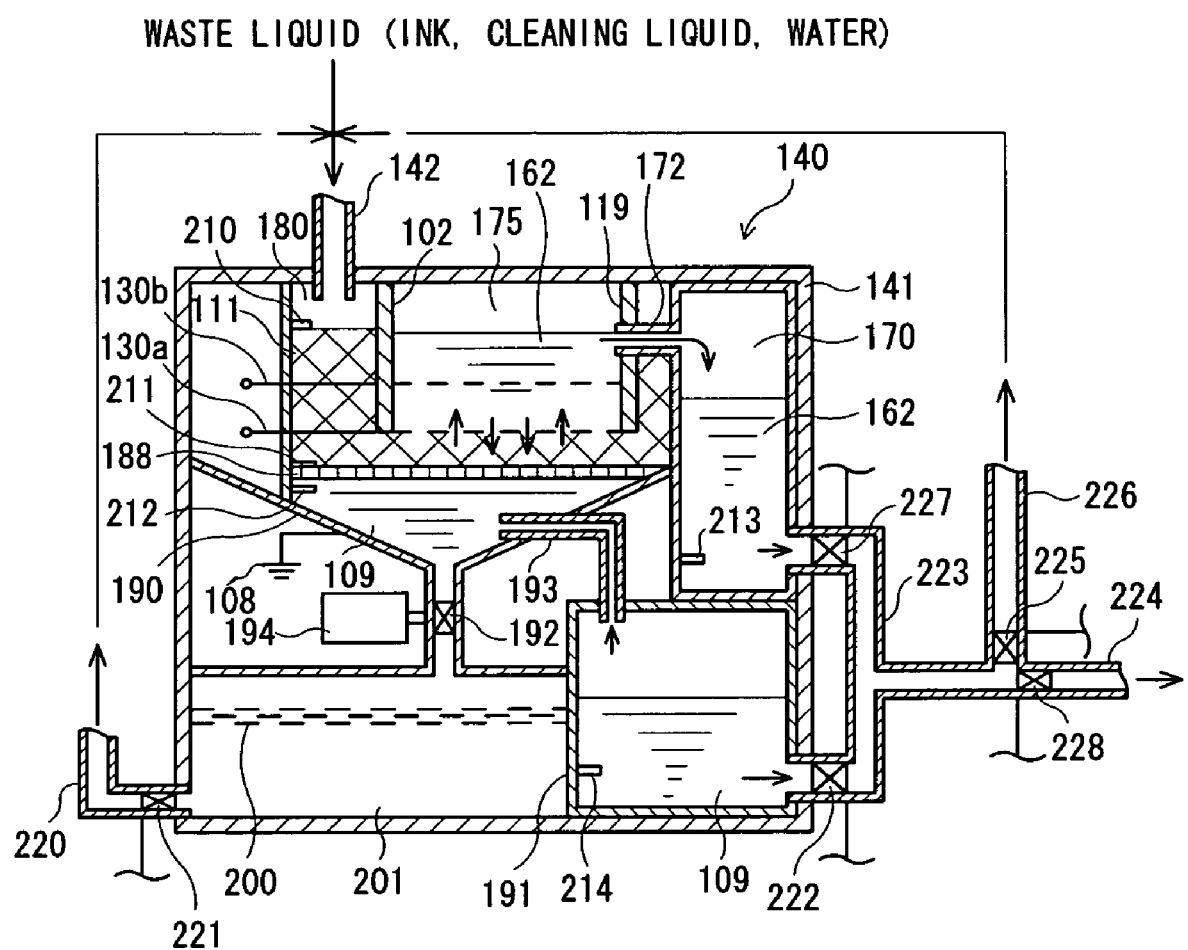
FIG. 20 is a view showing a waste liquid regeneration apparatus for a printer as an eleventh embodiment of the present invention and is a schematic sectional view as viewed in a sideward direction of a waste liquid reserving vessel of the waste liquid regeneration apparatus.
Figure 21:
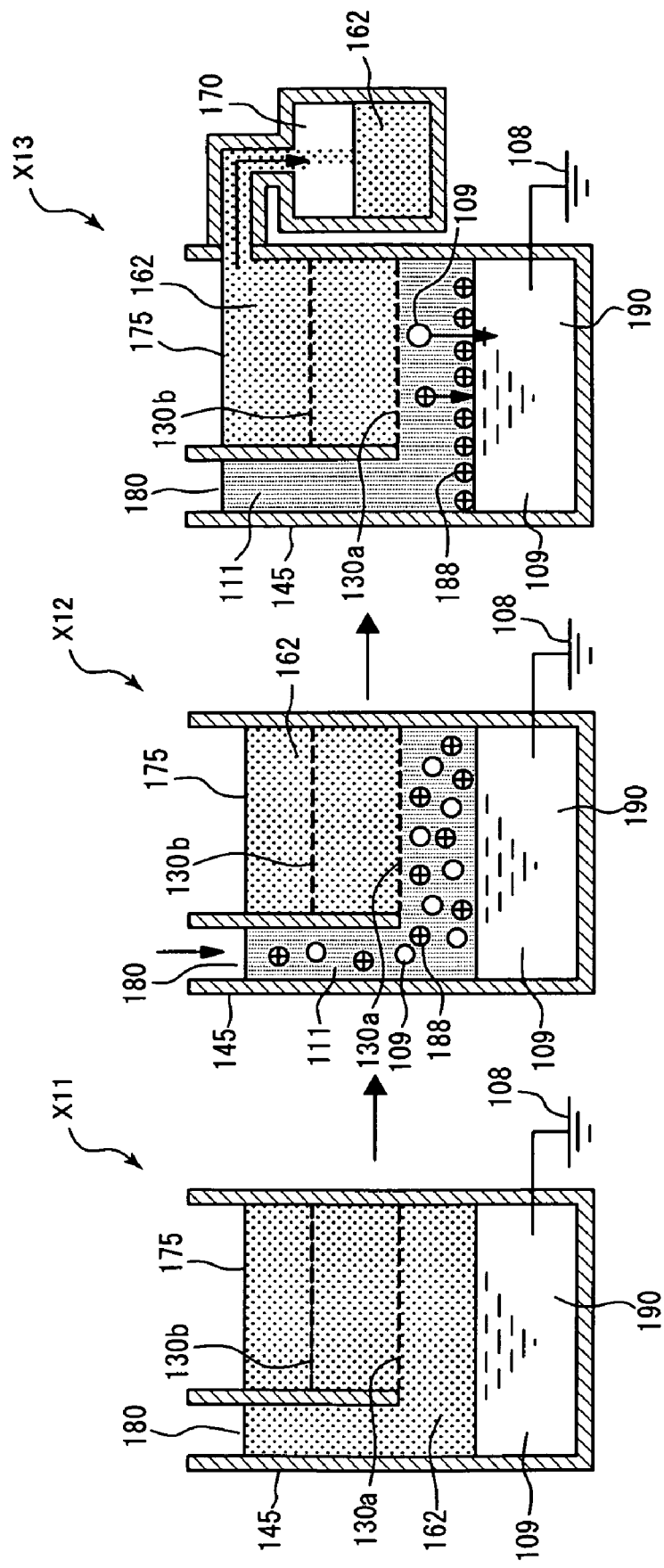
FIG. 21 is a schematic view illustrating a principle of the waste liquid regeneration apparatus for a printer and a waste liquid regeneration method for a printer as the eleventh embodiment of the present invention.
Figure 22:
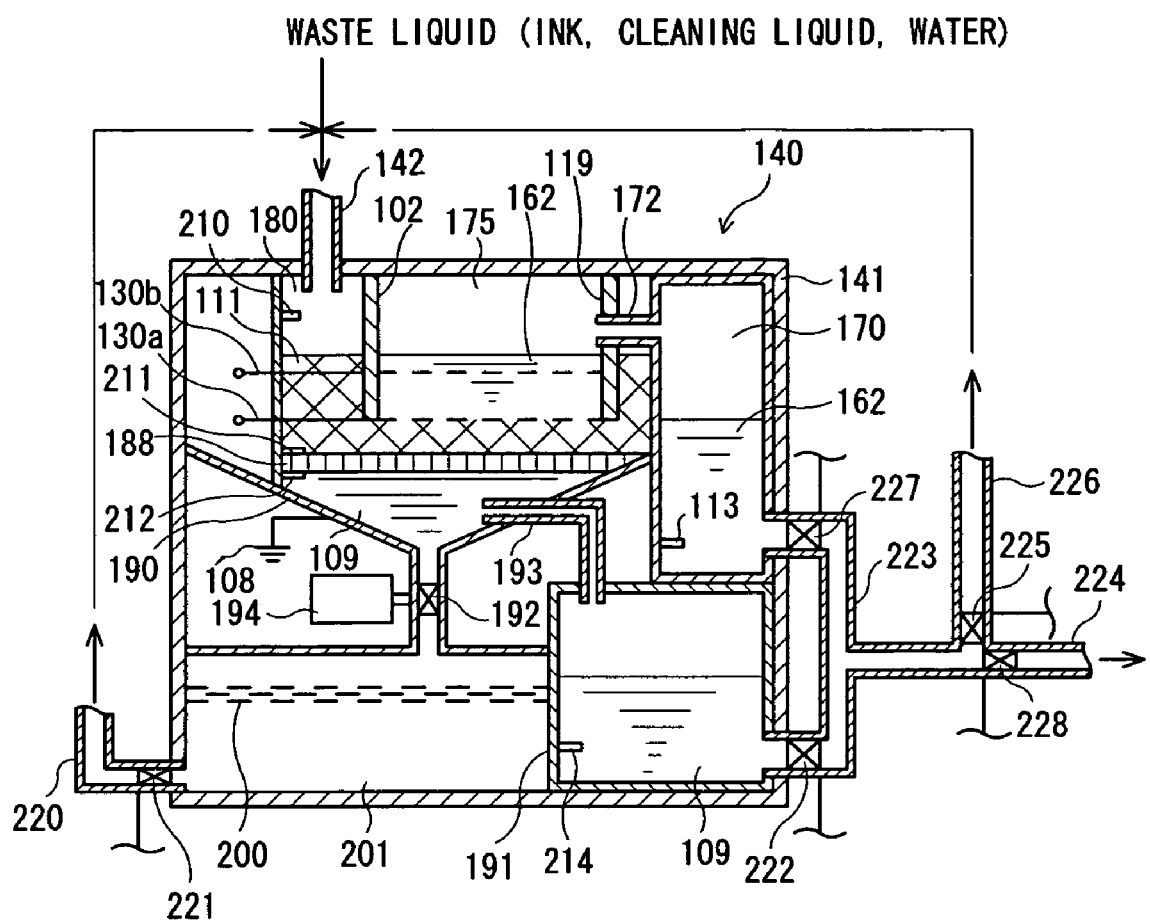
FIG. 22 is a view illustrating a waste liquid regeneration process by the waste liquid regeneration apparatus for a printer as the eleventh embodiment of the present invention and is a schematic sectional view as viewed in a sideward direction of a waste liquid reserving vessel of the waste liquid regeneration apparatus.
Figure 23:
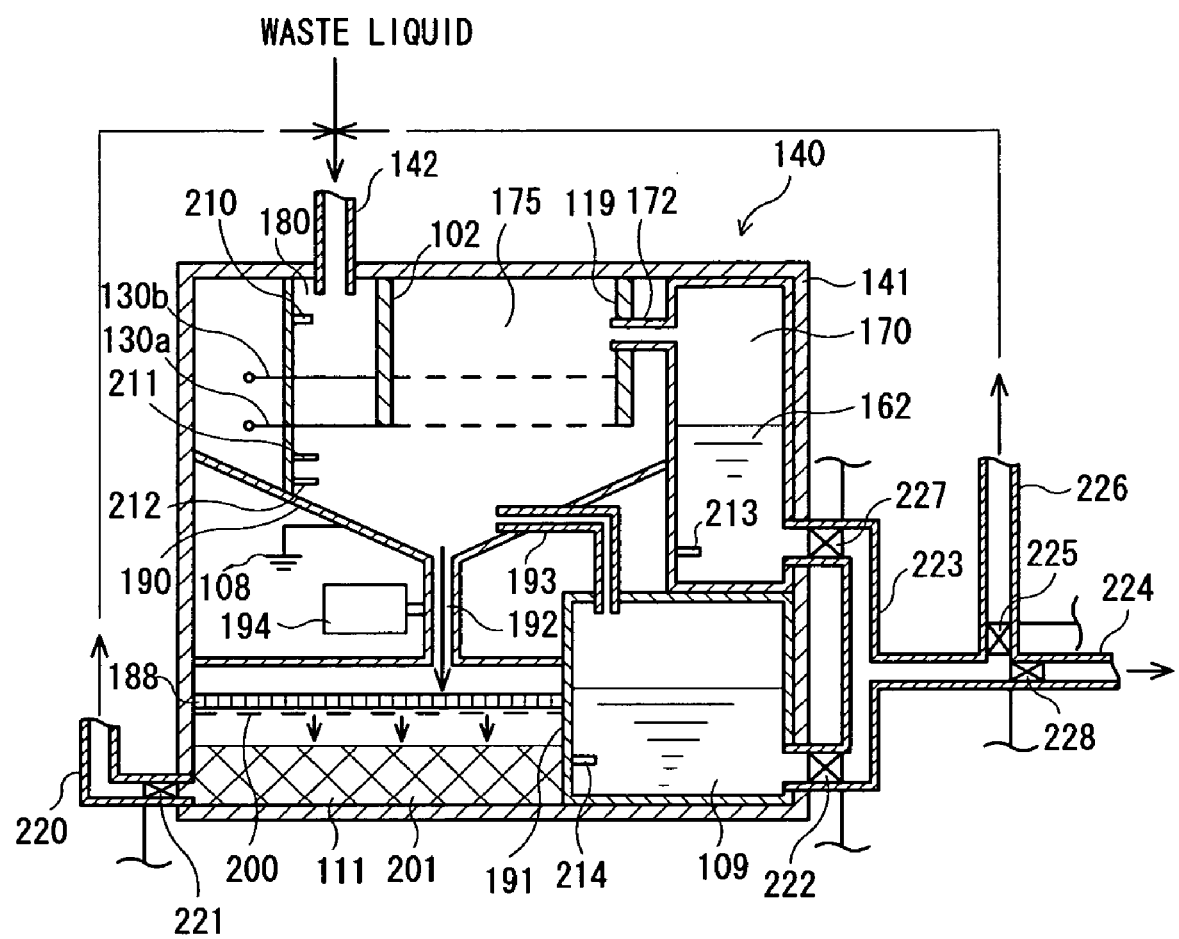
FIG. 23 is a view illustrating the waste liquid regeneration process by the waste liquid regeneration apparatus for a printer as the eleventh embodiment of the present invention and is a schematic sectional view as viewed in the sideward direction of the waste liquid reserving vessel of the waste liquid regeneration apparatus.
Figure 24:
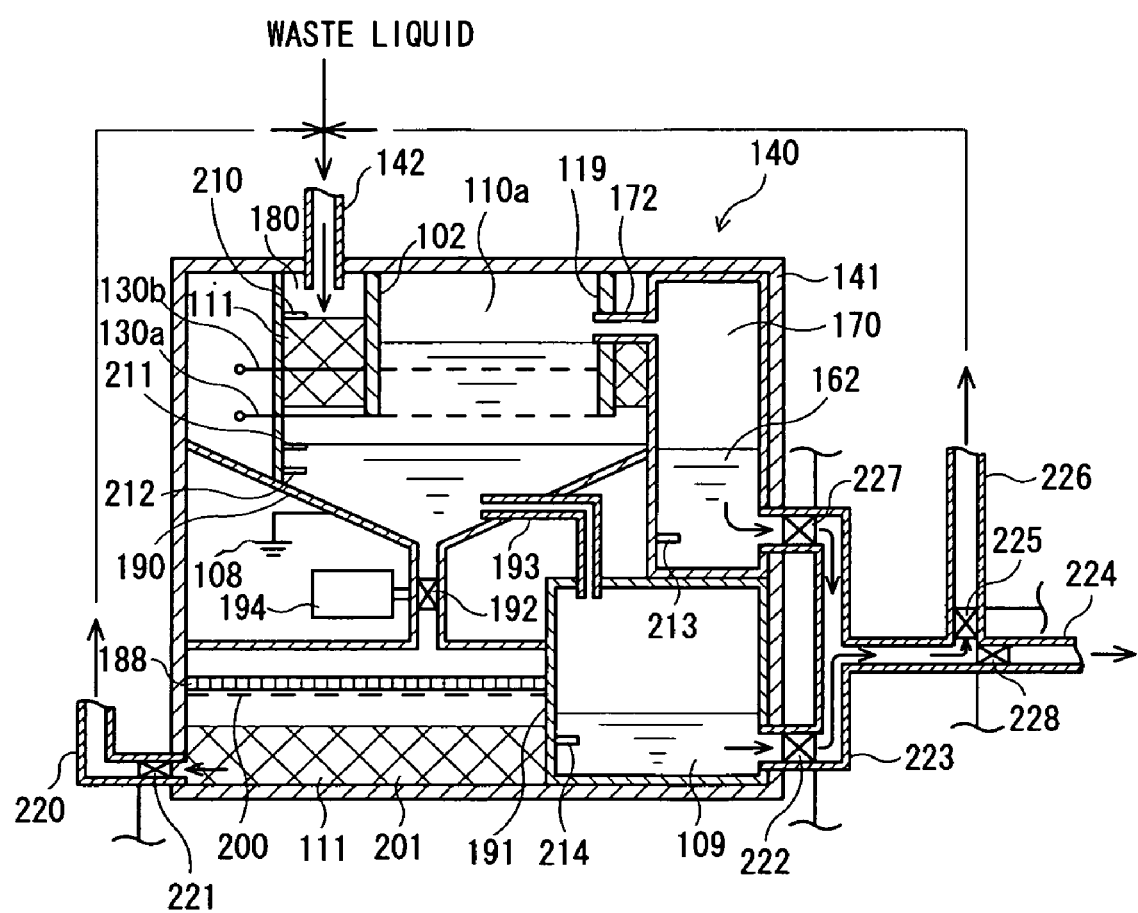
FIG. 24 is a view illustrating the waste liquid regeneration process by the waste liquid regeneration apparatus for a printer as the eleventh embodiment of the present invention and is a schematic sectional view as viewed in the sideward direction of the waste liquid reserving vessel of the waste liquid regeneration apparatus.

Now, an eleventh embodiment of the present invention is described. FIGS. 20 to 25 show a waste liquid regeneration apparatus and a waste liquid regeneration method for a printer according to an eleventh embodiment of the present invention, and wherein FIG. 20 is a schematic sectional view of the waste liquid regeneration apparatus as viewed in a sideward direction of a waste liquid reserving vessel; FIG. 21 is a schematic view illustrating a waste liquid regeneration principle of the waste liquid regeneration apparatus; and FIGS. 22 to 24 are schematic sectional views illustrating a waste liquid regeneration process of the waste liquid regeneration apparatus.

As shown in FIG. 20, the waste liquid regeneration apparatus 140 for a printer inudes a waste liquid tank 180, a regeneration tank 175, a water recovering water tank 190, a regenerated liquid tank 170, a recovered water tank 191 and a filter tank 201 provided integrally in an armoring case 141. Of the components, the waste liquid tank (first chamber) 180, regeneration tank (second tank) 175 and water recovering water tank (third chamber) 190 are formed as a single vessel 145 and are provided at an upper portion of a central portion in the armoring case 141. A space defined by vertical insulating walls 102 and 119 is provided at an upper portion in the vessel 145, and two metal electrode plates 130a and 130b are provided horizontally or substantially horizontally in an upwardly and downwardly spaced relationship from each other in the space. A space partitioned by the insulating walls 102 and 119 and the lower side metal electrode plate 130a forms the regeneration tank 175, and a space on the outer side of the regeneration tank 175 serves as the waste liquid tank 180. A waste liquid loading pipe 142 for loading waste liquid 111 into the waste liquid tank 180 is provided above the waste liquid tank 180. A bottom portion of the vessel 145 is formed in a funnel shape, and a space surrounded by the conical face of the funnel serves as the water recovering water tank 190.

The metal electrode plates 130a and 130b are connected to a high voltage power supply not shown such that high voltages are applied thereto. A potential difference is provided between the two metal electrode plates 130a and 130b, and a higher voltage than that applied to the metal electrode plate 130a nearer to the water recovering water tank 190 is applied to the metal electrode plate 130b farther from the water recovering water tank 190. Meanwhile, a grounding electrode 108 is connected to the water recovering water tank 190 so as to energize regenerated water 109 in the water recovering water tank 190.

In an initial state, clean water 109 and cleaning liquid 162 are poured into the vessel 145, and the water 109 having a higher specific gravity settles in the water recovering water tank 190 while the cleaning liquid 162 having a lower specific gravity is reserved in the waste liquid tank 180 and the regeneration tank 175 as seen in X11 of FIG. 21. In this state, if waste liquid 111 is supplied into the waste liquid tank 180 as seen in X12 of FIG. 21, then the water 109, ink pigment 188 and cleaning liquid 162 existing in a mixed state in the waste liquid 111 diffuse in the waste liquid tank 180.

Here, if high voltages are applied to the metal electrode plates 130a and 130b, then since the water 109 is conductive while the cleaning liquid 162 is insulating, the water 109 itself in the water recovering water tank 190 connected to the grounding electrode 108 serves as the ground and electric fields are generated between the metal electrode plates 130a and 130b and the water 109 in the water recovering water tank 190. Consequently, electrophoresis of the ink pigment 188 in the cleaning liquid 162 and electrostatic agglomeration of the water 109 begin, and the water 109 and the ink pigment 188 move individually and separately from each other.

As the reaction in the electric fields advances (that is, as the state wherein the electric fields are generated continues for a long period of time), the water 109 and the ink pigment 188 are separated fully from the cleaning liquid 162, and the water 109 agglomerates into a mass and settles toward the water recovering water tank 190 by the gravity as seen in X13 of FIG. 21. Further, the ink pigment 188 of the + charges is attracted to the water 109 in the water recovering water tank 190 serving as the − pole and agglomerates into a film in the proximity of the interface of the water 109. Consequently, the water 109 and the ink pigment 188 are separated fully from the cleaning liquid 162, and only the cleanly regenerated cleaning liquid 162 is reserved into the regeneration tank 175 through the metal electrode plates 130a and 130b. As seen also in FIG. 20, the regenerated liquid tank 170 is provided sidewardly adjacent the regeneration tank 175, and the regenerated liquid tank 170 and the regeneration tank 175 are communicated with each other through a regenerated liquid recovering pipe 172. The position of the liquid surface of the regeneration tank 175 rises by an amount corresponding to the amount of the waste liquid 111 supplied into the waste liquid tank 180, and as a result of the liquid surface position, the clean cleaning liquid (regenerated cleaning liquid) 162 overflows from the regeneration tank 175 and is recovered into the regenerated liquid tank 170.

The recovered water tank 191 is provided below the water recovering water tank 190. The water recovering water tank 190 and the recovered water tank 191 are communicated with each other through a recovering pipe 193. An on-off valve 195 is provided for the recovering pipe 193 and operates in response to detection signals of two upper and lower water interface detection sensors 211 and 212 provided in the vessel 145. In particular, if the water interface detection sensor 211 on the upper side detects the interface of the regenerated water 109, then the on-off valve 195 is opened, but if the water interface detection sensor 212 on the lower side detects the interface of the regenerated water 109, then the on-off valve 195 is closed. Consequently, the interface of the regenerated water 109 is held between the water interface detection sensors 211 and 212, and the region between the water interface detection sensors 211 and 212 serves as a substantial boundary between the waste liquid tank 180 and the water recovering water tank 190.

The filter tank 201 is provided immediately below the water recovering water tank 190. An on-off valve 192 is provided between an end of the bottom of the water recovering water tank 190 and the filter tank 201. The on-off valve 192 is used to open or close the water tank 190, and is driven to open or close by an opening-closing driving motor 194 and is normally closed. A filter 200 is disposed horizontally or substantially horizontally in the filter tank 201. In the waste liquid regeneration apparatus 140, if the film thickness of the ink pigment 188 exceeds a predetermined allowable value, then the operation of the apparatus 140 is stopped and the on-off valve 192 is opened so that the ink pigment 188 is dropped into the filter tank 201 together with the water 109 and the waste liquid 111 in the vessel 145. The water 109 and the waste liquid 111 pass through the filter 200 and are recovered at a lower portion in the filter tank 201 while the ink pigment 188 is caught by the filter 200 and recovered.

A pipe 223 is connected to the bottom of the regenerated liquid tank 170, and an on-off valve 227 is provided at an entrance of the pipe 223. The pipe 223 is connected to the bottom of the recovered water tank 191, and an on-off valve 222 is provided at another entrance of the pipe 223. A pipe 220 is connected to a lower portion of the filter tank 201, and a non-off valve 221 is interposed at an entrance of the pipe 220. The on-off valves 227, 222 and 221 are normally closed, but are opened when the regenerated cleaning liquid 162, regenerated water 109 and waste liquid 111 recovered in the tanks 170, 191 and 201 are to be discharged.

The pipe 223 connected to the regenerated liquid tank 170 and the recovered water tank 191 is branched into two pipes 224 and 226, and on-off valves 228 and 225 are interposed in the pipes 224 and 226 in the proximity of the branching portion. The on-off valve 225 is provided to allow the regenerated cleaning liquid 162 and the water 109 to be returned to the waste liquid tank 180 while the on-off valve 228 is provided to allow the regenerated cleaning liquid 162 and the water 109 to be fed to a blanket cleaning apparatus. The pipes 220, 223 and 226 function as returning flow paths for returning the regenerated liquid 162, regenerated water 109 and waste liquid 111 to the waste liquid tank 180.

It is to be noted that, in addition to the water interface detection sensors 211 and 212 provided in the water tank 190, liquid face detection sensors are provided individually for the tanks so that an overflow or a level drop can be prevented. In particular, a waste liquid level sensor 210 for detecting the top face of the waste liquid 111 is provided in the waste liquid tank 180, and a liquid face detection sensor 213 for detecting the top face of the regenerated cleaning liquid 162 is provided in the regeneration tank 175 while a liquid face detection sensor 214 for detecting the top face of the recovered water 109 is provided in the recovered water tank 191.

Subsequently, a waste liquid regeneration process by the waste liquid regeneration apparatus of the present embodiment is described. If regeneration of waste liquid is performed in accordance with the principle illustrated in FIG. 21, then the regenerated liquid 162 and the water 109 separated as time passes from the state illustrated in FIG. 20 upon starting of the regeneration are reserved into the tanks 170 and 191, respectively, and also the ink pigment film 188 becomes thicker simultaneously. Then, after predetermined time passes, the ink pigment film 188 exhibits a rise to a position close to the application electrode 130a as in the state illustrated in FIG. 22.

If the ink pigment 188 further rises, then the ink pigment 188 may possibly come into contact with the application electrode 130a to cause electrical leak, and therefore, for example, after a work for one day comes to an end (or after predetermined time passes after starting of the regeneration), it is necessary to stop the regeneration and dispose of the ink pigment 188.

On the other hand, the regenerated liquid 162 regenerated and reserved in the regenerated liquid tank 170 and the water 109 recovered in the recovered water tank 191 are sent to and used by the blanket cleaning apparatus (not shown) for cleaning of a blanket by opening the on-off valves 227 and 222 and the on-off valve 228, respectively. Thereafter, the regenerated liquid 162 and the water 109 are recovered as the waste liquid 111 and sent into the waste liquid tank 180 and then recyed. It is to be noted that only one of the regenerated liquid 162 and the water 109 may otherwise be used by itself. To this end, only a required one or ones of the valves may be opened.

Disposal of the ink pigment 188 described above can be performed in the following manner. In particular, after the ink pigment 188 is separated up to the state of FIG. 22, it is recovered into the filter tank 201. If the on-off valve 192 provided at a lower portion of the water tank 190 is opened, then the water 109 in the water tank 190 and the ink pigment film 188 separated on the surface of the water 109 as well as the waste liquid 111 in the waste liquid tank 180 and the waste liquid 111 and the regenerated liquid 162 in the regeneration tank 175 drop into the filter tank 201 provided below the water tank 190.

Since the ink pigment film 188 is discharged suddenly together with the waste liquid 111, regenerated liquid 162 and water 109, also the ink pigment 188 which has a high viscosity is dropped simultaneously by the water flow.

At this time, since the filter 200 is interposed in the filter tank 201, the ink pigment 188 dropping into the filter tank 201 is collected by the filter 200 while the other water 109, waste liquid 111 and regenerated cleaning liquid 162 are reserved into a lower portion in the filter tank 201 as seen in FIG. 23.

As a result, the waste liquid tank 180, regeneration tank 175 and water tank 190 are placed in an empty state as seen in FIG. 23. However, the regenerated cleaning liquid 162 is reserved in the regenerated liquid tank 170 and the water 109 is reserved in the recovered water tank 191 as well. Further, while the dropped water 109, waste liquid 111 and regenerated cleaning liquid 162 are reserved as the mixed waste liquid 111 in the filter tank 201, the waste liquid 111 is regenerated again. Meanwhile, the filter 200 by which the ink pigment 188 is collected is used for similar recovery by several times until a predetermined filter collection capacity thereof is exhausted, and thereafter, it is drawn out to the outside and disposed of while a new filter is set in exchange.

After the disposal of the ink pigment is performed in this manner, the waste liquid regeneration apparatus is restarted in the following manner from the state of FIG. 24. In particular, the regenerated cleaning liquid 162 reserved in the regenerated liquid tank 170 and the water 9 reserved in the water tank 191 are first supplied into the regeneration tank 175 and the waste liquid tank 180. At this time, the on-off valves 222 and 227 of the tanks 170 and 191 and the on-off valve 225 of the pipe (supplying pipe) 226 are opened to perform the supply.

The supply of the waste liquid 111 and of the water 109 to the regeneration tanks 180 and 175 is performed until the top face of the water 109 comes to a position between the water interface detection sensors 211 and 212 whereas the supply of the regenerated cleaning liquid 162 is performed until a state in which the voltages can be applied to the electrodes is reached (until a state wherein the regenerated cleaning liquid 162 is stored to the level of the application electrodes 130a and 130b). In this state, since only the clean water 109 and regenerated cleaning liquid 162 are present in the regeneration tank 175, the inside of the regeneration tank 175 is free from contamination.

Thereafter, the waste liquid 111 reserved in the filter tank 201 is regenerated. To this end, the voltages are applied to the electrodes 130a and 130b, and the on-off valve 221 for the filter tank 201 is opened to supply the waste liquid 111 from the waste liquid loading pipe 142 into the waste liquid tank 180 through the pipe 220.

When the waste liquid 111 is supplied in this manner, it is separated into the ink pigment 188, regenerated cleaning liquid 162 and water 109 simultaneously, and consequently, the waste liquid 111 is regenerated by the action and process described above. Then, after the waste liquid in the filter tank 201 is all supplied, waste liquid after used for cleaning of the blanket is supplied and regenerated as in an original case.

Thereafter, as a process similar to that described above is repeated, the cleaning waste liquid 111 is separated into cleaning liquid 162, regenerated water 109 and ink pigment 188, and the ink pigment 188 is recovered by the filter 200 and disposed of while the regenerated water 109 and the regenerated cleaning liquid 162 are reused.

Accordingly, with the waste liquid regeneration apparatus of the present embodiment, in the system wherein the three components of the ink pigment 188, insulating cleaning liquid 162 and conductive water 109 exist in a mixed state, the three components can be separated from one another by means of a single apparatus without providing the grounding electrode in the inside of the vessel while utilizing the conductivity of the water. Besides, such separation can be performed efficiently in comparatively short time. Also recovery and removal of the ink pigment 188 and reuse of the water 109 and the regenerated liquid 162 can be performed readily and smoothly, resulting in significant improvement in practical use.

Figure 25A:
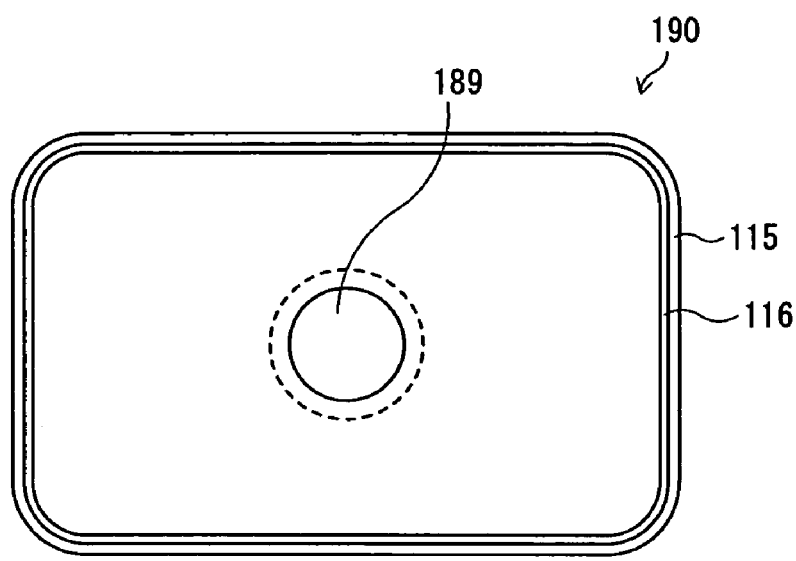
FIG. 25($a$) is a plan view showing a water recovering water tank according to a twelfth embodiment of the present invention.
Figure 25B:
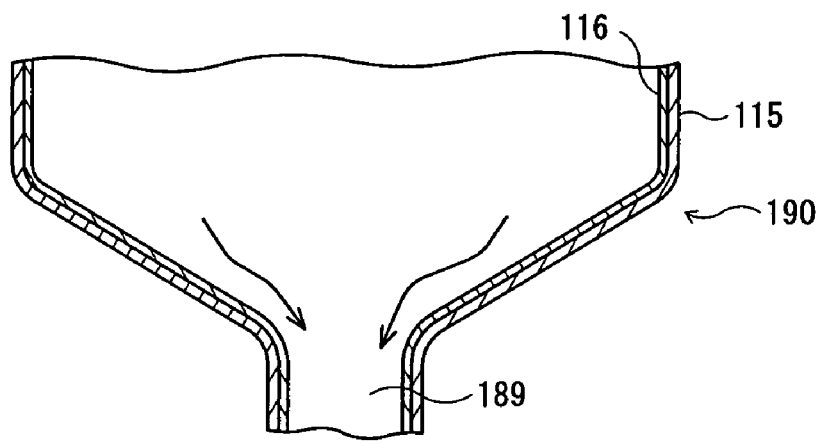

Now, a twelfth embodiment of the present invention is described. FIGS. 25(a) and 25(b) are views showing a water recovering water tank of a waste liquid regeneration apparatus for a printer according to the twelfth embodiment of the present invention, and wherein FIG. 25(a) is a top plan view of the water recovering water tank and FIG. 25(b) is a schematic sectional view as viewed in a sideward direction of the water recovering water tank.

The present embodiment is characterized in the water recovering water tank 190, and the other part thereof is configured similar to that of the eleventh embodiment. In particular, what is most significant with the present invention is that a configuration which allows the separated ink pigment 188 to be disposed of to the outside is provided. To this end, it is necessary to allow the ink pigment 188 separated on the surface of the water 109 in the water tank 190 to drop smoothly and thoroughly without adhering to the inner face of the water tank 190. Therefore, in the present embodiment, the water recovering water tank 190 is configured in the following manner.

As shown in FIG. 25(b), the water recovering water tank 190 is formed in a funnel shape, and a soil release process layer 116 is applied to the inner face of a water tank body 115. The soil release process may be a resin work, for example, of PTFE or a process which makes use of tiles, pottery or the like.

Due to the configuration described above, according to the waste liquid regeneration apparatus of the present embodiment, the ink pigment film 188 separated on the surface of the water in the water tank 190 is discharged smoothly from an outlet 189 at a lower end of the water tank 190 together with the water 109 and so forth. Accordingly, the separated ink pigment 188 can be disposed of to the outside with certainty.

Now, a thirteenth embodiment of the present invention is described.

In the waste liquid regeneration apparatus of the eleventh embodiment described hereinabove, since the metal electrode plates 130a and 130b are configured so as to allow the cleaning liquid 162 to flow therethrough, when no voltage is applied to them, also the ink pigment 188 mixed in the cleaning liquid 162 can pass through the metal electrode plates 130a and 130b. However, when voltages are applied to the metal electrode plates 130a and 130b, since the metal electrode plates 130a and 130b serve as the + poles, the ink pigment 188 having the + charges cannot pass through the metal electrode plates 130a and 130b readily. Particularly since a higher voltage than that applied to the metal electrode plate 130a on the lower side is applied to the metal electrode plate 130b on the upper side, even if the ink pigment 188 should pass through the metal electrode plate 130a, it is electrically migrated toward the metal electrode plate 130b by an electric field between the metal electrode plate 130b and the metal electrode plate 130a, and it is difficult for the ink pigment 188 to further pass through the metal electrode plate 130b and flow into an upper portion of the regeneration tank 175. The metal electrode plates 130a and 130b function as filters for preventing the ink pigment 188 from flowing into the inside of the regeneration tank 175, particularly into an upper portion of the regeneration tank 175, together with the cleaning liquid 162.

Since the two metal electrode plates 130a and 130b function as double filters in this manner, with the waste liquid regeneration apparatus of the thirteenth embodiment, a flow of the ink pigment 188 into the regeneration tank 175 partitioned by the metal electrode plate 130a is controlled, and further, a flow of the ink pigment 188 into an upper portion of the regeneration tank 175 partitioned by the metal electrode plate 130b is controlled. Consequently, cleaning liquid 164 having a high purity can be recovered into the regenerated liquid tank 170.

However, even where the two metal electrode plates 130a and 130b are disposed, if a large amount of waste liquid 111 is continuously supplied into the waste liquid tank 180 in order to reduce the regeneration processing time, then there is the possibility that the ink pigment 188 may pass through the metal electrode plates 130a and 130b and flow into the regeneration tank 175 and then mix into the cleaning liquid 164 to be recovered into the regenerated liquid tank 170. While the waste liquid 111 is supplied into the waste liquid tank 180, ink pigment 188 which is not electrically agglomerated as yet is present afloat on the interface of the water 109 in the water recovering water tank 190 in the cleaning liquid 164 of the waste liquid tank 180 as seen in X12 of FIG. 21. The ink pigment 188 afloat in the cleaning liquid 164 is pushed out into the regeneration tank 175 together with the cleaning liquid 164 by the flowing force of the waste liquid 111 supplied from behind.

Therefore, in order to maintain the purity of the regenerated cleaning liquid (cleaning liquid 164 to be recovered into the regenerated liquid tank 170), there is a limitation to the supplying speed (amount to be supplied per hour) of the waste liquid 111, and it is difficult to process a large amount of waste liquid 111 at a time. It is to be noted that one of possible solutions to the subject just described is to increase the number of metal electrode plates serving as filters or raise the voltages to be applied to the metal electrode plates to make it difficult for the ink pigment 188 to pass through the inside of the regeneration tank 175. However, the increase of the number of metal electrode plates increases the cost as much, and the increase of the voltages to be applied increases the possibility of electrical leak.

Therefore, the waste liquid regeneration apparatus for a printer according to the present embodiment adopts such a waste liquid supplying method as described below to make it possible to decrease the regeneration processing time while the number of metal electrode plates and the applied voltages are maintained.

Figure 26:
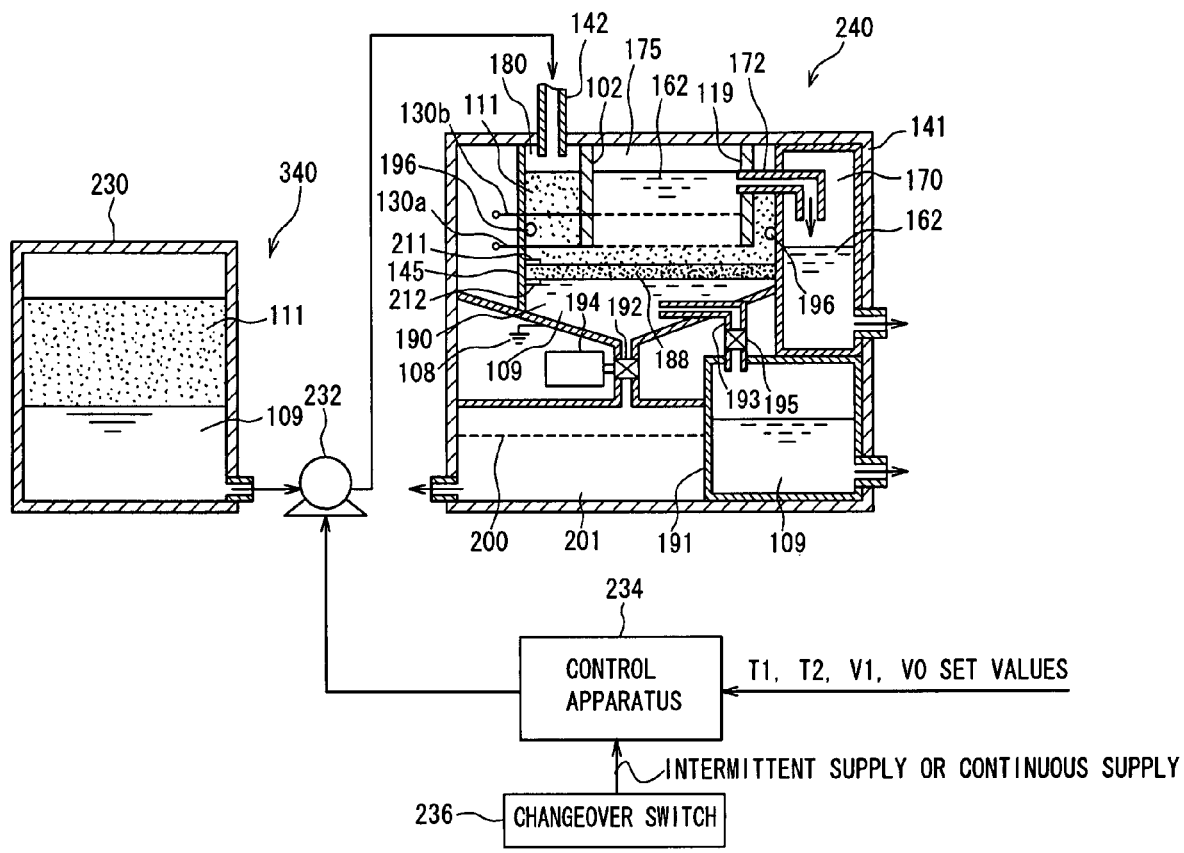
FIG. 26 is a view showing a waste liquid regeneration apparatus for a printer according to a thirteenth embodiment of the present invention and is a schematic view showing a section as viewed in a sideward direction of the waste liquid regeneration apparatus and both of a waste liquid supplying system and a controlling system.

FIG. 26 is a view schematically showing a cross section of the waste liquid regeneration apparatus for a printer according to the present embodiment as viewed in a sideward direction together with a waste liquid supplying system and a controlling system. The waste liquid regeneration apparatus 240 for a printer according to the present embodiment has a similar basic configuration beginning with a waste liquid regeneration principle to that of the waste liquid regeneration apparatus according to the eleventh embodiment described hereinabove with reference to FIG. 21, and in the figure, common elements are denoted by like reference characters.

First, the waste liquid supplying apparatus 340 which is a characteristic element of the waste liquid regeneration apparatus according to the present embodiment is described. The waste liquid supplying apparatus 340 is an apparatus for supplying waste liquid 111 to the waste liquid regeneration apparatus 240 and inudes a waste liquid recovering tank 230 for storing waste liquid 111 recovered from the printer, a pump 232 for pressure feeding the waste liquid 111 from the waste liquid recovering tank 230 to the waste liquid loading pipe 142 of the waste liquid regeneration apparatus 240, and a control apparatus 234 for controlling operation of the pump 232.

As an operation method (waste liquid supplying method) of the pump 232 by the control apparatus 234, a continuous supplying method for continuously supplying the waste liquid 111 at a fixed speed and an intermittent supplying method for alternately repeating supplying and stopping of the waste liquid 111 are available. The waste liquid supplying apparatus 340 uses the intermittent supplying method as a basic method for the operation of the pump 232. However, the operation method can be arbitrarily changed over between the continuous supplying method and the intermittent supplying method by means of a changeover switch 236 connected to the control apparatus 234.

Figure 27:
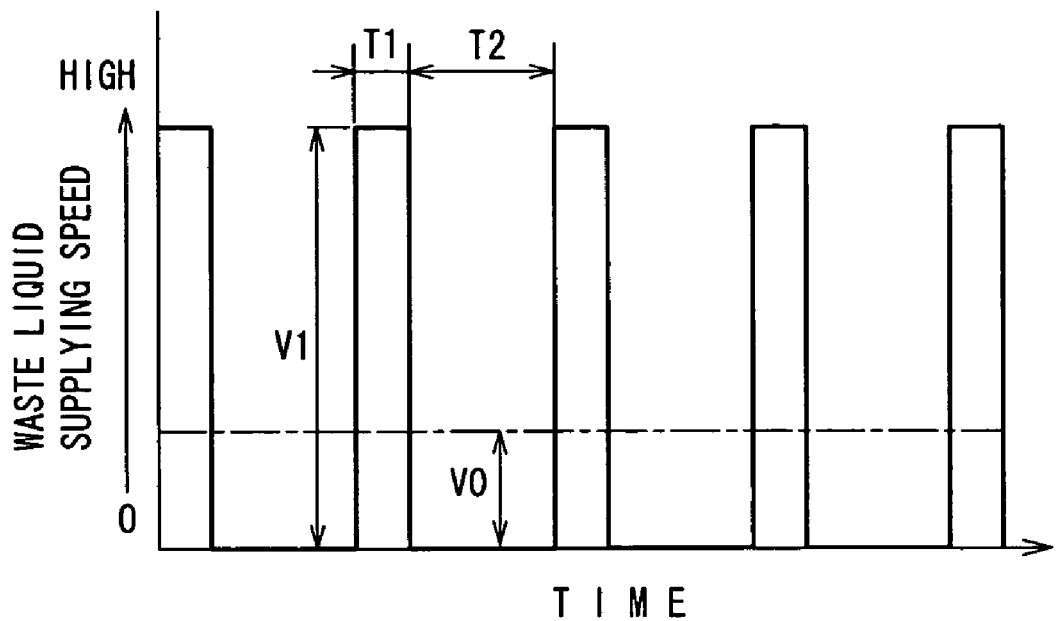
FIG. 27 is a view showing a waste liquid supplying method according to the thirteenth embodiment of the present invention in comparison with a conventional waste liquid supplying method.
Figure 28:
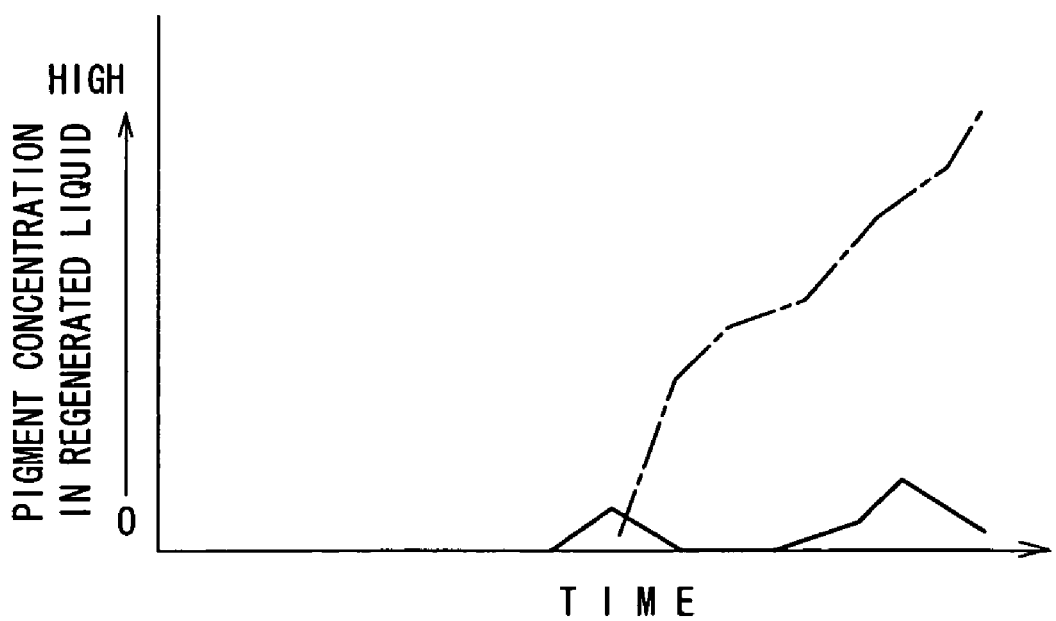
FIG. 28 is a graph illustrating operation and an effect of the waste liquid supplying method according to the thirteenth embodiment of the present invention.

FIG. 28 illustrates comparison between the intermittent supplying method and the continuous supplying method in terms of the concentration of ink pigment contained in the cleaning liquid 162 recovered in the regeneration tank 175. In the continuous supplying method illustrated in an alternate long and short dash line in FIG. 28, the waste liquid 111 is supplied at a comparatively low fixed speed V0 as indicated by an alternate long and short dash line in FIG. 27. In the intermittent supplying method indicated by a solid line in FIG. 28, the waste liquid 111 is first supplied for fixed time T1 at a comparatively high speed V1, and then the supply of the waste liquid 111 is stopped for fixed time T2, as indicated by a solid line in FIG. 27. Thus, in the comparison, an equal amount of waste liquid as a whole is processed by both methods. It is to be noted that, in the control apparatus 234 according to the present embodiment, not only the supplying speed V0 of the waste liquid 111 in the continuous supplying method but also the supplying speed V1, supplying time T1 and stopping time T2 of the waste liquid 111 in the intermittent supplying method can be adjusted arbitrarily from the outside so that optimum values based on a result of an experiment or the like can be set to them.

As seen in FIG. 28, where an equal amount of waste liquid 111 is processed, the concentration of ink pigment contained in the regenerated cleaning liquid 162 can be suppressed lower with the intermittent supplying method than with the continuous supplying method. This is because, where the continuous supplying method is used, the cleaning liquid 162 in the waste liquid tank 180 is normally turbid with the ink pigment 188, but where the intermittent supplying method is used, the ink pigment 188 in the waste liquid tank 180 agglomerates, during stopping of the supply of the waste liquid 111, to the interface of the regenerated water 109 by electrophoresis by an action of the electric field and the purity of the cleaning liquid 162 in the waste liquid tank 180 gradually rises. In particular, since the purity of the cleaning liquid 162 in the waste liquid tank 180 is high, even if the supply of the waste liquid to the waste liquid tank 180 is resumed and a flow of the cleaning liquid 162 from the waste liquid tank 180 to the regeneration tank 175 is generated, the ink pigment 188 is prevented from flowing into the regeneration tank 175 passing through the metal electrode plates 130a and 130b together with the cleaning liquid 162.

Further, in the continuous supplying method, it is necessary to supply the waste liquid 111 slowly at a low speed so that the ink pigment 188 may not be pushed out through the metal electrode plates 130a and 130b to the regeneration tank 175. In contrast, in the intermittent supplying method, for a period of time until the ink pigment 188 diffuses in the waste liquid tank 180 as a result of the supply of the waste liquid 111 to lower the purity of the cleaning liquid 162 in the waste liquid tank 180, the waste liquid 111 can be supplied at a high supplying speed. Accordingly, with the intermittent supplying method, a high processing capacity can be obtained as a whole when compared with the continuous supplying method, and the regeneration processing time can be reduced while the purity of the cleaning liquid 162 is maintained.

The reason why the waste liquid supplying apparatus 340 can select not only the intermittent supplying method which has such advantages as described above but also the continuous supplying method is that processing of water 109 settling in the waste liquid recovering tank 230 is taken into consideration. In particular, the waste liquid 111 is a mixture of the ink pigment 188, water 109 and cleaning liquid 162, and while it is stored in the waste liquid recovering tank 230, the water 109 and the cleaning liquid 162 in the waste liquid 111 separate upwardly and downwardly from each other due to the difference in specific gravity. Therefore, waste liquid 111 which contains water as a major component is sometimes supplied from the waste liquid recovering tank 230, and in such an instance, even if the waste liquid 111 is supplied continuously, the purity of the cleaning liquid 162 in the waste liquid tank 180 does not drop. Further, even if the waste liquid 111 is supplied at a high supplying speed, the possibility that the ink pigment 188 may flow into the regeneration tank 175 passing through the metal electrode plates 130a and 130b together with the cleaning liquid 162 is low.

In this manner, where the waste liquid 111 contains the water 109 as a major component, even where the continuous supplying method is used, the purity of the cleaning liquid 162 can be maintained. Therefore, it is not necessary to use the intermittent supplying method to supply the waste liquid 111, but rather, where the continuous supplying method is used and the supplying speed is raised to supply the waste liquid 111, the regeneration processing time can be reduced when compared with that where the intermittent supplying method is used for the supply. Accordingly, where the waste liquid 111 contains the cleaning liquid 162 as a major component in which the ink pigment 188 is mixed, such an intermittent supplying method as described above is used, but where the waste liquid 111 contains the water 109 as a major component, the operation method of the pump 232 can be changed over from the intermittent supplying method to the continuous supplying method by means of the changeover switch 236 to raise the processing capacity. Consequently, the regeneration processing time can be further reduced as a whole.

It is to be noted that the waste liquid regeneration apparatus of the present embodiment adopts the following configuration as a further modification to the waste liquid regeneration apparatus of the eleventh embodiment.

First, if the film of the ink pigment 188 adhering to the interface of the regenerated water 109 touches with the metal electrode plate 130a, then there is the possibility that electrical leak may occur. Therefore, the position of the water interface detection sensor 211 is set to a position spaced by a certain distance from the metal electrode plate 130a taking the film thickness of the ink pigment 188 into consideration.

Further, when the on-off valve 192 is opened to recover the ink pigment 188 into the filter tank 201, there is the possibility that not a small amount of the ink pigment 188 may remain adhering to a wall of the vessel 145. When the waste liquid regeneration apparatus 240 is to be restarted, fresh water 109 and cleaning liquid 162 are loaded into the waste liquid tank 180 from the waste liquid loading pipe 142 first and the water 109 is filled into the water tank 190, and the waste liquid regeneration apparatus 240 is restarted in a state wherein the cleaning liquid 162 is filled in the waste liquid tank 180 and the regeneration tank 175. At this time, if the ink pigment 188 remains in the vessel 145, then the loaded cleaning liquid 162 is contaminated with the ink pigment 188, and before the voltages are applied, the ink pigment 188 is admitted into the regeneration tank 175 together with the cleaning liquid 162. Therefore, in the present embodiment, as a countermeasure for preventing remaining of the ink pigment 188, the location of the water interface detection sensor 212 on the lower side is set to a position higher than the conical face of the funnel formed on the bottom of the vessel 145. This is a countermeasure for making it difficult for the film of the ink pigment 188 agglomerating on the interface of the water 109 to adhere to the conical face of the funnel. Further, shower nozzles 196 are mounted on a surrounding side wall of the waste liquid tank 180. The shower nozzles 196 are adapted to jet a shower toward the conical face of the funnel along the wall face of the waste liquid tank 180 so that the ink pigment 188 adhering to the conical face of the funnel may be compulsorily washed away by the shower.

Now, a fourteenth embodiment of the present invention is described.

Figure 29:
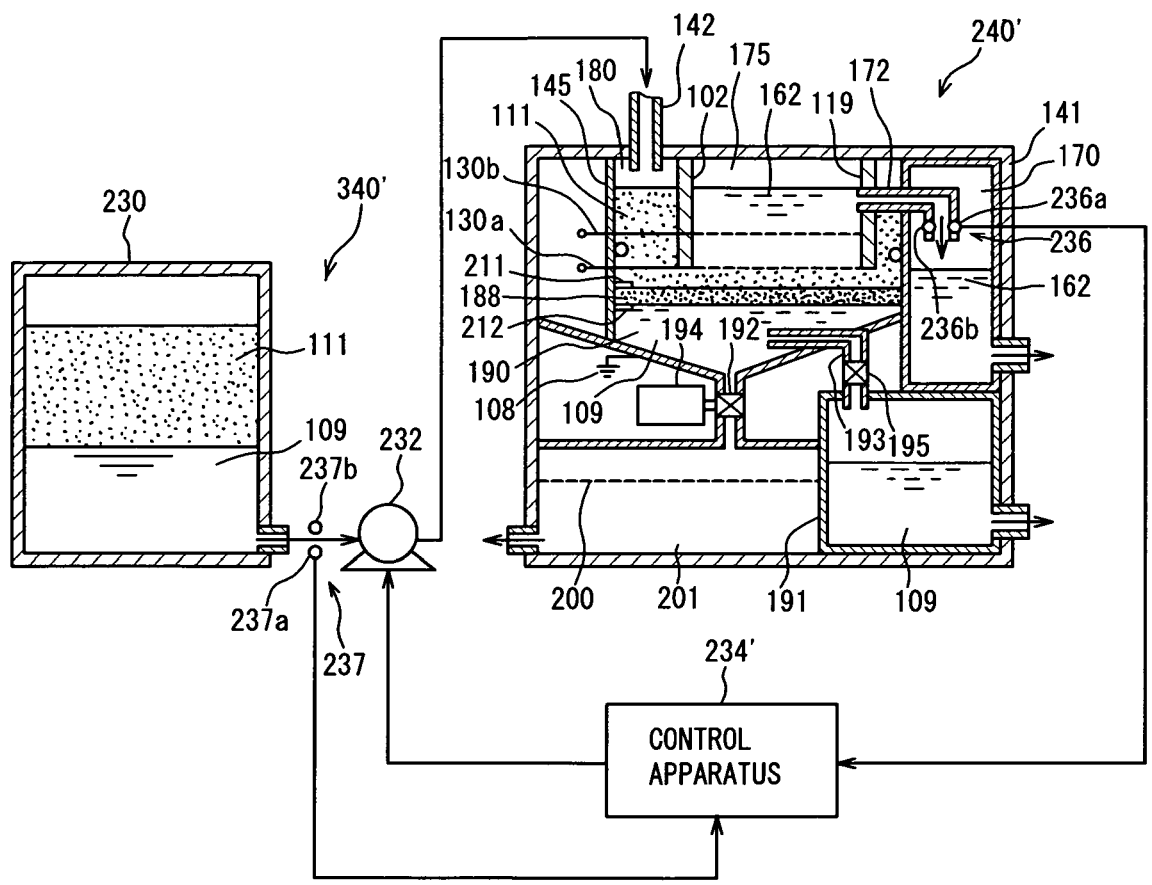
FIG. 29 is a view showing a waste liquid regeneration apparatus for a printer according to a fourteenth embodiment of the present invention and is a schematic view showing a section as viewed in a sideward direction of the waste liquid regeneration apparatus and both of a waste liquid supplying system and a controlling system.
Figure 30:
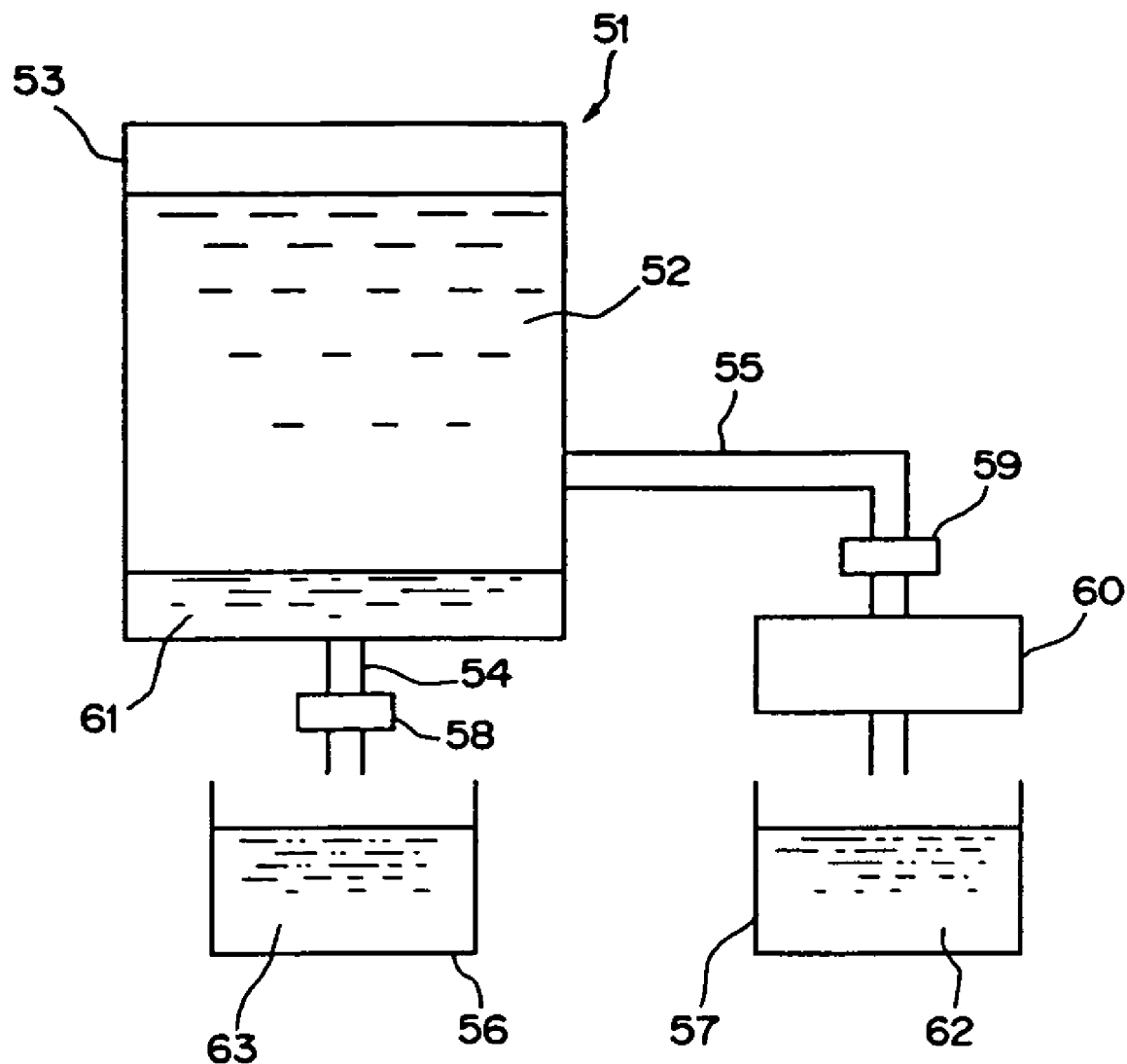
FIG. 30 is a schematic view showing a configuration of a conventional waste liquid regeneration apparatus for a printer.

FIG. 29 is a view schematically showing a cross section of a waste liquid regeneration apparatus for a printer according to the fourteenth embodiment of the present invention as viewed in a sideward direction together with a waste liquid supplying system and a controlling system. The waste liquid regeneration apparatus 240' for a printer according to the present embodiment is characterized in the configuration of a waste liquid supplying apparatus 340', particularly a controlling system for the waste liquid supplying apparatus 340', and the configuration of the other part of the waste liquid regeneration apparatus 240' is same as that of the thirteenth embodiment. Accordingly, in the figure, common elements to those of the thirteenth embodiment are denoted by like reference characters, and description of them is omitted.

The waste liquid regeneration apparatus 240' according to the present embodiment inudes a waste liquid recovering tank 230, a pump 232, a control apparatus 234' and two sensors 236 and 237. The control apparatus 234' can change over the waste liquid supplying method for the pump 232 between the continuous supplying method and the intermittent supplying method similarly to the control apparatus 234 according to the thirteenth embodiment. However, the control apparatus 234' can further perform the changeover automatically. Furthermore, the control apparatus 234' can automatically perform setting of the stopping time T2 (refer to FIG. 27) of waste liquid supply in the intermittent supplying method.

First, the automatic changeover of the waste liquid supplying method is described. A signal from the sensor 237 provided at an exit of the waste liquid recovering tank 230 is inputted to the control apparatus 234'. The sensor 237 inudes a light emitting/receiving element 237a and a reflecting plate 237b and detects a light passing state through the waste liquid 111 discharged from the waste liquid recovering tank 230. Where the waste liquid 111 contains the water 109 as a major component, the element 237a can detect reflected light from the reflecting plate 237b, but where the waste liquid 111 contains the cleaning liquid 162 in which the ink pigment 188 is mixed as a major component, since the waste liquid 111 is almost black, the element 237a cannot detect reflected light. Accordingly, when the element 237a detects reflected light and an on signal is outputted from the element 237a, it can be discriminated that the waste liquid 111 which contains the water 109 as a major component is supplied, but when the element 237a does not detect reflected light and an off signal is outputted from the element 237a, it can be discriminated that the waste liquid 111 which contains the cleaning liquid 162 having the ink pigment 188 mixed therein as a major component is supplied. Thus, the control apparatus 234' changes over the waste liquid supplying method in response to on/off of the signal from the sensor 237 such that, when the signal from the sensor 237 is an off signal, the control apparatus 234' controls the pump 232 to operate in accordance with the intermittent supplying method, but when the signal from the sensor 237 is an on signal, the control apparatus 234' controls the pump 232 to operate in accordance with the continuous supplying method. Where automatic changeover is performed in this manner, the waste liquid supplying method can be changed over precisely, and the processing capacity as a whole can be further raised to further reduce the regeneration processing time.

Now, the automatic setting of the stopping time T2 of waste liquid supply in the intermittent supplying method is described. A signal from the sensor 236 provided for the regenerated liquid recovering pipe 172 is inputted to the control apparatus 234'. The sensor 236 inudes a light emitting/receiving element 236a and a reflecting plate 236b, and the element 236a and the reflecting plate 236b are disposed on opposing wall faces of the regenerated liquid recovering pipe 172. The changeover switch 236 detects the intensity of reflected light from the reflecting plate 236b received by the element 236a, that is, the transmission factor of the regenerated cleaning liquid 162 flowing in the regenerated liquid recovering pipe 172, and outputs the transmission factor to the control apparatus 234'. The control apparatus 234' collates the detected transmission factor of the regenerated cleaning liquid 162 with a calibration curve to determine the concentration of the ink pigment 188 in the regenerated cleaning liquid 162. The calibration line is determined by an experiment and represents a relationship between the transmission factor and the ink pigment concentration. The control apparatus 234' compares the resulting ink pigment concentration with an upper limit value of a predetermined control range, and if the ink pigment concentration exceeds the upper limit value, then the control apparatus 234' increases the stopping time T2 in accordance with the difference between them. As the stopping time T2 increases, the agglomeration of the ink pigment 188 to the regenerated water interface in the waste liquid tank 180 proceeds as much, and therefore, when the waste liquid supply is resumed, a flow of the ink pigment 188 into the regeneration tank 175 can be suppressed. Consequently, the concentration of the ink pigment in the cleaning liquid 162 can be lowered. On the other hand, if the ink pigment concentration is lower than the upper limit value, then the control apparatus 234' maintains the current stopping time T2. Since the ink pigment concentration of the regenerated cleaning liquid 162 is fed back to the stopping time T2 of waste liquid supply in this manner, the purity of the regenerated cleaning liquid 162 can always be maintained.

While the embodiments of the present invention have been described above, the present invention is not limited to the specific embodiments but can be carried out in various modified forms without departing from the spirit and scope of the present invention. For example, a greater number of metal electrode plates 30 may be installed in the vessel 2. Further, only it is necessary for the metal electrode plates 30 to allow waste liquid to flow therethrough, and the metal electrode plates 30 are not limited to those of the wire mesh type.

Further, while, in the thirteenth embodiment, the waste liquid supplying method is changed over between the intermittent supplying method and the continuous supplying method, the pump 232 may otherwise be operated normally in accordance with the intermittent supplying method. Where at least the intermittent supplying method is used, the regeneration processing time can be reduced while maintaining the purity of the regenerated cleaning liquid when compared with an alternative case wherein the continuous supplying system is normally used.

Further, while, in the fourteenth embodiment, the automatic changeover control between the intermittent supplying method and the continuous supplying method and the feedback control of the stopping time T2 in the intermittent supplying method are used, only one of the controls may otherwise be used. Furthermore, the control object of the feed back control may include not only the stopping time T2 of waste liquid supply but also the supplying speed V1 or the supplying time T1 of waste liquid supply, may include a plurality of ones of them.

The invention claimed is:

1. A waste liquid regeneration apparatus for a printer, comprising:
   a vessel into which waste liquid containing ink pigment, water and cleaning fluid used in the printer is supplied;
   a first chamber and a second chamber provided in said vessel;
   a metal electrode plate disposed substantially horizontally in said vessel so as to partition said first chamber from said second chamber while allowing the waste liquid to flow between said first chamber and said second chamber, said metal electrode plate having a top surface facing said second chamber and an under surface facing said first chamber;
   a third chamber, located below said first chamber and separated from said metal electrode plate, for reserving water;
   a high voltage power supply for applying a voltage to said metal electrode plate;
   a grounding electrode connected to the water in said third chamber; and
   a waste liquid supplying apparatus for supplying the waste liquid to said first chamber, said waste liquid supplying apparatus being operable under an intermittent supplying mode, in which mode the waste liquid is alternately supplied for a fixed time period and stopped from being supplied for a fixed time period to said first chamber.

2. The waste liquid regeneration apparatus of claim 1, and further comprising:
   a first detection apparatus for detecting a physical characteristic that correlates with the concentration of the ink pigment in regenerated cleaning fluid regenerated by said waste liquid regeneration apparatus;
   a control apparatus for controlling at least one of a supply rate, supply time and stopping time of the waste liquid by said waste liquid supply apparatus in response to a detection result from said first detection apparatus such that the concentration of the ink pigment in the regenerated cleaning fluid remains within a predetermined control range.

3. The waste liquid regeneration apparatus of claim 1, wherein said waste liquid supply apparatus further has a continuous supplying mode in which the waste liquid is supplied continuously to said first chamber, said waste liquid supplying apparatus being operable to be switched between said intermittent supplying mode and said continuous supplying mode.

4. The waste liquid regeneration apparatus of claim 3, and further comprising:
   a second detection apparatus for detecting a physical amount correlated with the concentration of the water in the waste liquid supplied into said first chamber by said waste liquid supplying apparatus; and
   a changeover apparatus for changing over said waste liquid supplying apparatus between said intermittent supplying mode and said continuous supplying mode as a result of detection by said second detection apparatus in such a manner that when the concentration of the water in the waste liquid is within a predetermined range, said waste liquid supplying apparatus is operated in said intermittent supplying mode and when the concentration of the water in the waste liquid is outside of the predetermined range, said waste liquid supplying apparatus is operated in said continuous supplying mode.

* * * * *